US012244096B2

(12) United States Patent
Martin

(10) Patent No.: US 12,244,096 B2
(45) Date of Patent: Mar. 4, 2025

(54) ELECTRICAL CONTACT POSITION ASSURANCE FOR ELECTRICAL CONNECTOR SYSTEM

(71) Applicant: TE Connectivity Solutions GmbH, Schaffhausen (CH)

(72) Inventor: Galen M. Martin, Mechanicsburg, PA (US)

(73) Assignee: TE Connectivity Solutions GmbH (CH)

( * ) Notice: Subject to any disclaimer, the term of this patent is extended or adjusted under 35 U.S.C. 154(b) by 387 days.

(21) Appl. No.: 17/894,618

(22) Filed: Aug. 24, 2022

(65) Prior Publication Data

US 2023/0268693 A1 Aug. 24, 2023

Related U.S. Application Data

(63) Continuation-in-part of application No. 17/675,094, filed on Feb. 18, 2022, now Pat. No. 12,046,858.

(51) Int. Cl.

| | |
|---|---|
| ***H01R 13/641*** | (2006.01) |
| ***H01R 4/18*** | (2006.01) |
| ***H01R 13/11*** | (2006.01) |
| ***H01R 13/52*** | (2006.01) |
| ***H01R 13/533*** | (2006.01) |
| ***H01R 13/627*** | (2006.01) |

(52) U.S. Cl.

CPC ............. *H01R 13/641* (2013.01); *H01R 4/18* (2013.01); *H01R 13/11* (2013.01); *H01R 13/5202* (2013.01); *H01R 13/533* (2013.01); *H01R 13/6271* (2013.01); *H01R 2201/26* (2013.01)

(58) Field of Classification Search

CPC ........ H01R 13/641; H01R 4/18; H01R 13/11; H01R 13/5202; H01R 13/533; H01R 13/6271; H01R 2201/26; H01R 12/75; H01R 13/7031; H01R 12/716; H01R 13/6272; H01R 13/5219; H01R 13/639

See application file for complete search history.

(56) References Cited

U.S. PATENT DOCUMENTS

| | | | | |
|---|---|---|---|---|
| 5,605,472 A * | 2/1997 | Sakai | ................. | H01R 13/6272 439/352 |
| 10,833,450 B2 * | 11/2020 | Mase | ................... | H01R 13/639 |
| 2017/0271815 A1 * | 9/2017 | Lane | .................. | H01R 13/6272 |
| 2023/0268696 A1 * | 8/2023 | Martin | ................. | H01R 13/641 439/188 |

* cited by examiner

*Primary Examiner* — Travis S Chambers

(57) ABSTRACT

A plug connector includes a plug housing coupled to a header connector and holding plug contacts mated with corresponding header contacts of a header connector. The plug connector includes an eCPA assembly coupled to the plug housing having an actuator movably coupled to the plug housing between a retracted position and an actuated position. The eCPA includes a plug eCPA terminal coupled to the actuator and movable by the actuator between a mated position and an unmated position for mating with a header eCPA terminal of the header connector. The eCPA includes an eCPA wire terminated to the plug eCPA terminal and routed to a remote electrical device. The plug eCPA terminal and the eCPA wire form a position assurance circuit with the header eCPA terminal in the mated position.

20 Claims, 13 Drawing Sheets

ELECTRICAL CONTACT POSITION ASSURANCE FOR ELECTRICAL CONNECTOR SYSTEM

CROSS REFERENCE TO RELATED APPLICATIONS

This application is a continuation-in-part and claims the benefit of U.S. patent application Ser. No. 17/675,094 filed Feb. 18, 2022, now U.S. Pat. No. 12,046,858, titled ELECTRICAL CONTACT POSITION ASSURANCE FOR ELECTRICAL CONNECTOR SYSTEM, the subject matter of which is herein incorporated by reference in its entirety.

BACKGROUND OF THE INVENTION

The subject matter herein relates generally to electrical connector systems.

Electrical connector systems use electrical connectors to electrically connect various components within a system, such as a vehicle. For example, a plug connector may be mated with a header connector. Each connector holds contacts that are mated when the plug connector is coupled to the header connector. If the connectors are only partially mated, the electrical connectors may work intermittently or not at all. Additionally, with power connectors, partial connection of the connectors could lead to damage, such as due to short circuiting or electrical arcing. It is desirable in some systems to provide assurance that the connectors are fully mated and that the connectors remain fully mated during use of the system.

BRIEF DESCRIPTION OF THE INVENTION

In one embodiment, a plug connector is provided and includes a plug housing extending between a front and a rear of the plug housing. The plug housing includes a cavity. The plug housing is configured to be coupled to a header connector. The plug housing has a mating end configured to be plugged into a header chamber of the header connector. The plug connector includes plug contacts held by the plug housing. The plug contacts are configured to be mated with corresponding header contacts of the header connector. The plug connector includes an electrical connector position assurance (eCPA) assembly coupled to the plug housing. The eCPA includes an actuator movably coupled to the plug housing. The actuator is movable between a retracted position and an actuated position. The eCPA includes a plug eCPA terminal coupled to the actuator and movable by the actuator between a mated position and an unmated position. The plug eCPA terminal configured to be mated with a header eCPA terminal of the header connector. The eCPA includes an eCPA wire terminated to the plug eCPA terminal. The eCPA wire is routed to a remote electrical device remote from the plug connector. The plug eCPA terminal is movable between the unmated position and the mated position as the actuator moves between the retracted position and the actuated position. The plug eCPA terminal and the eCPA wire form a position assurance circuit with the header eCPA terminal in the mated position.

In another embodiment, a plug connector is provided and includes a plug housing extending between a front and a rear of the plug housing. The plug housing includes a cavity. The plug housing is configured to be coupled to a header connector. The plug housing has a mating end configured to be plugged into a header chamber of the header connector. The plug connector includes a plug seal coupled to the plug housing. The plug seal configured to interface with the header connector to provide environmental sealing between the plug housing and the header connector. The plug connector includes plug contacts held by the plug housing. The plug contacts are configured to be mated with corresponding header contacts of the header connector. The plug connector includes an electrical connector position assurance (eCPA) assembly coupled to the plug housing. The eCPA includes an actuator, a plug eCPA terminal, an eCPA wire, and an eCPA seal. The actuator movably coupled to the plug housing. The actuator is movable between a retracted position and an actuated position. The eCPA wire is terminated to the plug eCPA terminal and routed to a remote electrical device remote from the plug connector. The plug eCPA terminal is coupled to the actuator and movable by the actuator between a mated position and an unmated position. The plug eCPA terminal includes a mating interface configured to be coupled to a header eCPA terminal of the header housing in the mated position. The plug eCPA terminal is movable between the unmated position and the mated position as the actuator moves between the retracted position and the actuated position. The plug eCPA terminal and the eCPA wire form a position assurance circuit in the mated position when the plug eCPA terminal is coupled to the header eCPA terminal. The eCPA seal is coupled to the actuator. The eCPA seal providing sealing between the actuator and the plug housing.

In a further embodiment, an electrical connector system is provided and includes a header connector including a header housing and header contacts held by the header housing. The header housing has a base and a shroud extending from the base. The shroud surrounds a shroud chamber. The header contacts are coupled to the base and extend into the shroud chamber. The electrical connector system includes a plug connector coupled to the header connector. The plug connector includes a plug housing extending between a front and a rear of the plug housing. The plug housing includes a cavity. The plug housing has a mating end plugged into the header chamber of the header connector. The plug connector includes plug contacts held by the plug housing and extending into the cavity. The plug contacts mated with corresponding header contacts of the header connector. The electrical connector system includes an electrical connector position assurance (eCPA) assembly operably coupled to the header connector and the plug connector. The eCPA assembly includes a header eCPA terminal in the shroud chamber. The eCPA includes an actuator movably coupled to the plug housing. The actuator is movable between a retracted position and an actuated position. The eCPA includes a plug eCPA terminal coupled to the actuator and movable by the actuator between a mated position and an unmated position. The plug eCPA terminal includes a mating interface configured to be coupled to the header eCPA terminal in the mated position. The plug eCPA terminal is movable between the unmated position and the mated position as the actuator moves between the retracted position and the actuated position. The eCPA includes an eCPA wire terminated to the plug eCPA terminal. The eCPA wire is routed to a remote electrical device remote from the plug connector. The eCPA terminal and the eCPA wire form a position assurance circuit in the mated position when the plug eCPA terminal is coupled to the header eCPA terminal.

DETAILED DESCRIPTION OF THE INVENTION

Figure 1:
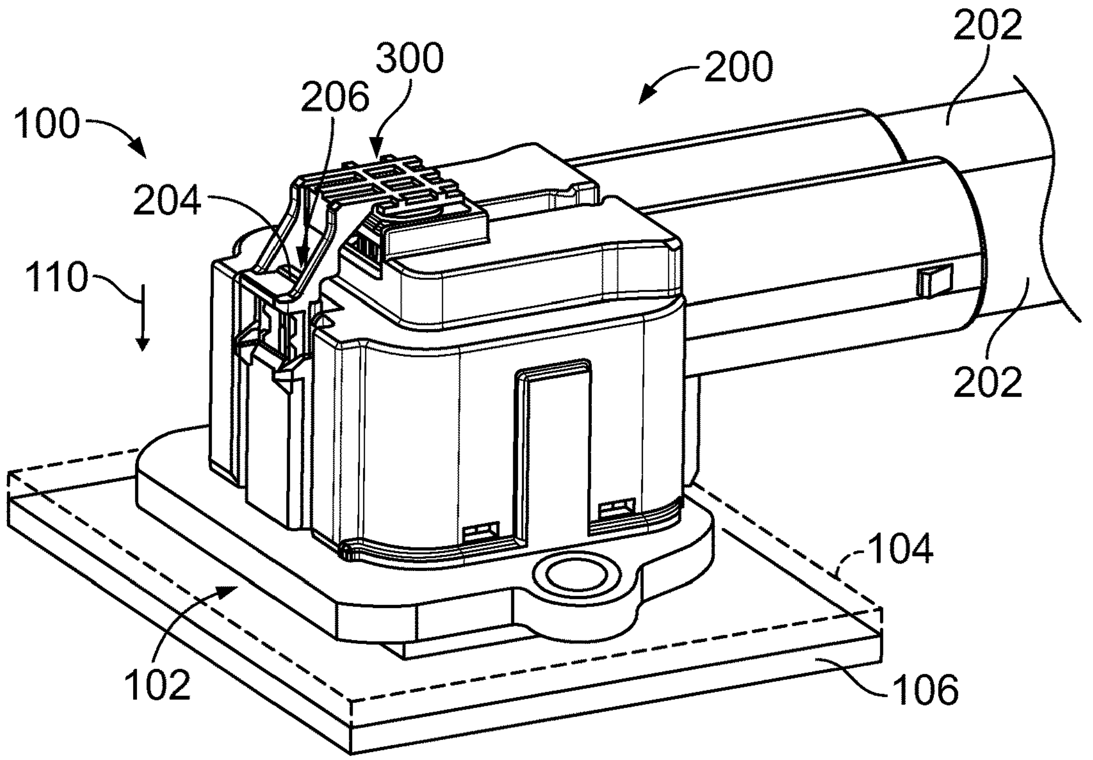
FIG. 1 is a top perspective view of an electrical connector system in accordance with an exemplary embodiment in a mated state.
Figure 2:
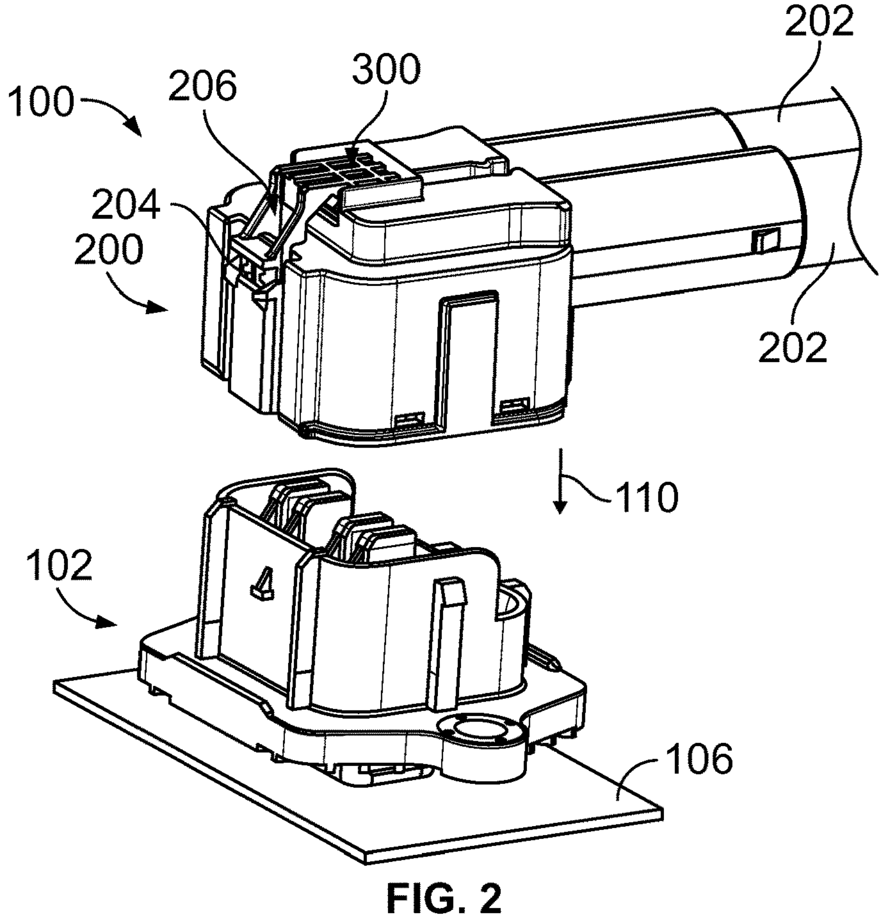
FIG. 2 is a perspective view of the electrical connector system in accordance with an exemplary embodiment in an unmated state.
Figure 3:
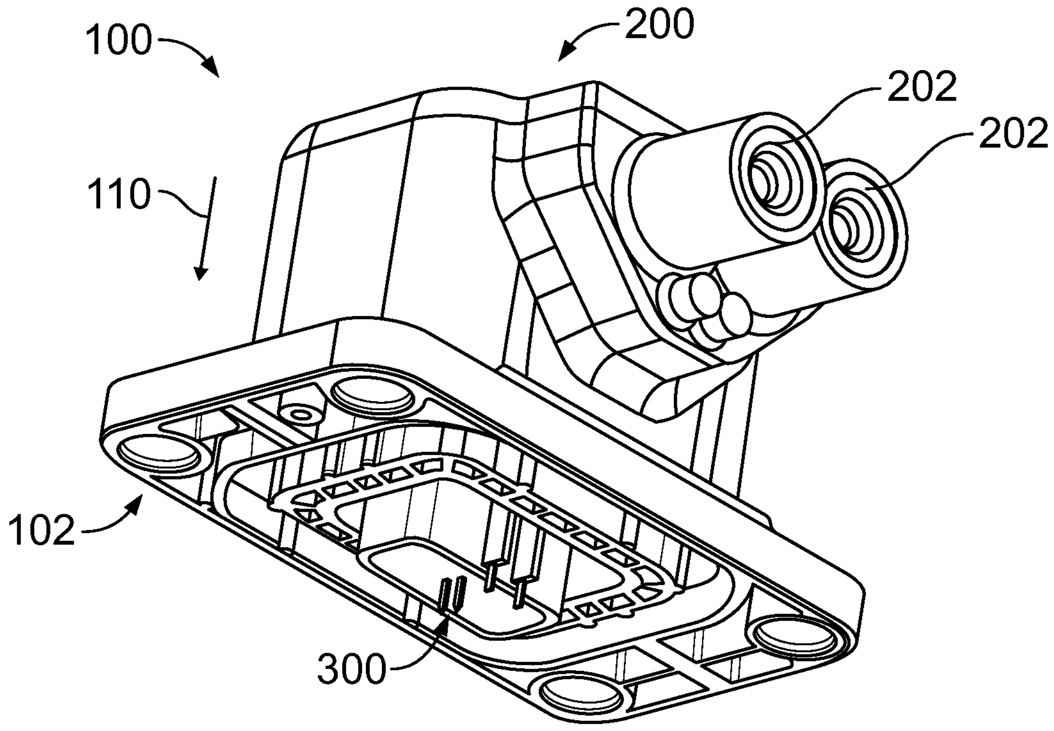
FIG. 3 is a bottom perspective view of the electrical connector system in accordance with an exemplary embodiment.

FIG. 1 is a top perspective view of an electrical connector system 100 in accordance with an exemplary embodiment in a mated state. FIG. 2 is a perspective view of the electrical connector system 100 in accordance with an exemplary embodiment in an unmated state. FIG. 3 is a bottom perspective view of the electrical connector system 100 in accordance with an exemplary embodiment. The electrical connector system 100 includes a header connector 102 and a plug connector 200 removably coupled to the header connector 102.

In an exemplary embodiment, the electrical connector system 100 includes an electrical connector position assurance (eCPA) assembly 300 operable to electrically assure or guarantee that the connectors 102, 200 are fully mated and properly latched together. In an exemplary embodiment, the eCPA assembly 300 is a sealed assembly providing a sealed interface for the connectors. For example, the electrical components of the eCPA assembly 300 are contained within a sealed environment.

The electrical connector system 100 may be used within a harsh environment, such as within a vehicle. The electrical connector system 100 may be exposed to moisture, dirt, debris, vibration, shock, and the like. In an exemplary embodiment, the header connector 102 is mounted to the vehicle, such as to a chassis or frame of the vehicle. The header connector 102 may be mounted to a component of the vehicle, such as the battery module or other electrical component of the vehicle. For example, the header connector 102 is mechanically mounted to a housing 104 (shown in phantom in FIG. 1) or other structure. The header connector 102 may be electrically connected to an electrical component of the vehicle, such as the battery module. For example, the header connector 102 may be electrically connected to a circuit board 106 located within the housing 104. The header connector 102 may transmit data and/or power to or from the circuit board 106. In alternative embodiments, the header connector 102 may be a cable connector rather than a board connector. For example, the header connector 102 may be provided at ends of cables (not shown).

The plug connector 200 is removably coupled to the header connector 102. The plug connector 200 is configured to be mated to the header connector 102 in a mating direction 110 (for example, a vertical direction). In an exemplary embodiment, the plug connector 200 is a cable connector. For example, the plug connector 200 is terminated to ends of cables 202. The cables 202 extend from the plug connector 200 and are routed to another component or area of the vehicle.

In an exemplary embodiment, the plug connector 200 includes a latch 204 for latchably coupling the plug connector 200 to the header connector 102. The latch 204 prevents inadvertent unmating of the plug connector 200 from the header connector 102. The latch 204 may be unlatched by an operator to unmate the plug connector 200 from the header connector 102. For example, the latch 204 may be movable between a latched position and an unlatched position. The latch 204 may be rotated or pivoted to the unlatched position, such as by pressing against an actuation end 206 of the latch 204. In an exemplary embodiment, the eCPA assembly 300 is configured to be operably coupled to the latch 204. The eCPA assembly 300 is used as a secondary lock for the latch 204. The eCPA assembly 300 may be used to back up the latch 204 and prevent the latch 204 from moving to the unlatched position when the eCPA assembly 300 is engaged. In various embodiments, the eCPA assembly 300 may only be engaged with the latch 204 when the plug connector 200 is in the latched position. As such, the eCPA assembly 300 ensures that the plug connector 200 is fully mated and remains mated at all times while the eCPA assembly 300 is engaged.

The eCPA assembly 300 creates a position assurance circuit that is only activated when the latch 204 is in the latched position and the eCPA assembly 300 is actuated. For example, the position assurance circuit may be a normally open circuit and the position assurance circuit is closed or made when the eCPA assembly 300 is actuated. In other embodiments, the position assurance circuit may be a normally closed circuit and the position assurance circuit is open or short circuited when the eCPA assembly 300 is actuated. The operation of the electrical connector system 100 may be controlled by the eCPA assembly 300. For example, power or signals may not be transmitted through the electrical connector system 100 unless and until the position assurance circuit is closed (or opened depending on the particular arrangement). As such, normal operation of the electrical connector system 100 only occurs when the plug connector 200 is fully mated with the header connector 102.

Figure 4:
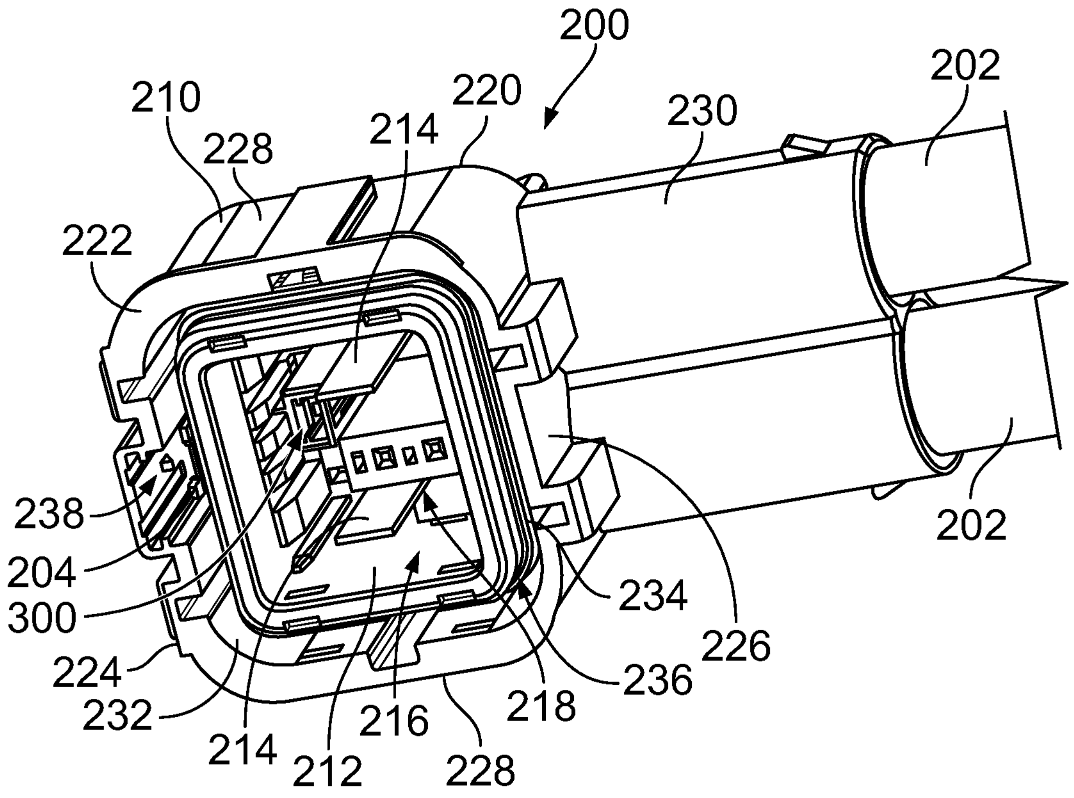
FIG. 4 is a perspective view of the plug connector in accordance with an exemplary embodiment.

FIG. 4 is a perspective view of the plug connector 200 in accordance with an exemplary embodiment. The plug connector 200 includes a plug housing 210 holding plug contacts 214. In an exemplary embodiment, the plug contacts 214 are planar blade contacts. However, other types of contacts may be used in alternative embodiments, such as sockets, pins, spring contacts, beam contacts, or other types of contacts. The cables 202 are coupled to the plug contacts 214 and extend from the plug housing 210 to a remote component. The latch 204 extends from the plug housing 210. The latch 204 may be integral with the plug housing 210. The eCPA assembly 300 is coupled to the plug housing 210.

The plug housing 210 may be manufactured from a dielectric material, such as a plastic material. The plug housing 210 may be a molded part. The plug housing 210 includes a mating end 211 configured to be plugged into the header connector 102. In an exemplary embodiment, the plug housing 210 includes a plug insert 212 defining the mating end 211, which is configured to be plugged into the header connector 102. The plug insert 212 may be integral with the plug housing 210, such as being molded with the plug housing 210. In other embodiments, the plug insert 212 may be separate from the plug housing 210 and coupled to the plug housing 210. In alternative embodiments, the plug housing 210 may be provided without a plug insert 212. In an exemplary embodiment, the plug housing 210 includes a cavity 216, which is configured to receive a portion of the header connector 102. The plug insert 212 holds the plug contacts 214, such as in contact channels 218. The plug contacts 214 extend into the cavity 216 for mating with the header connector 102.

The plug housing 210 extends between a top 220 and a bottom 222. The plug housing 210 includes a front 224 and a rear 226. The plug housing 210 includes sides 228 extending between the front 224 and the rear 226. In the illustrated embodiment, the latch 204 is provided at the front 224. Other locations are possible in alternative embodiments, such as at one or both of the sides 228. In the illustrated embodiment, the cables 202 extend from the rear 226, such as through cable bores passing through a cable ferrule 230 at the rear 226. Other locations are possible in alternative embodiments, such as the top 220. In an exemplary embodiment, the bottom 222 defines a mating end of the plug connector 200. The cavity 216 is open at the bottom 222 to receive the header connector 102.

In an exemplary embodiment, the plug housing 210 includes an outer wall 232 that surrounds the plug insert 212. The outer wall 232 may be generally box shaped. In an exemplary embodiment, an environmental seal 234 is received in a seal pocket 236 between the outer wall 232 and the plug insert 212. The seal 234 is configured to be sealed to the outer wall 232 and/or the plug insert 212 and is configured to be sealed to the header connector 102. The seal 234 provides environmental sealing at the interface between the plug connector 200 and the header connector 102, such as to prevent moisture or debris from entering the cavity 216.

In an exemplary embodiment, the plug housing 210 includes a latch pocket 238 at the front 224. The latch 204 is located in the latch pocket 238. In an exemplary embodiment, a portion of the eCPA assembly 300 extends into the latch pocket 238. The latch pocket 238 may be open at the bottom 222, such as to receive a latching portion of the header connector 102.

Figure 5:
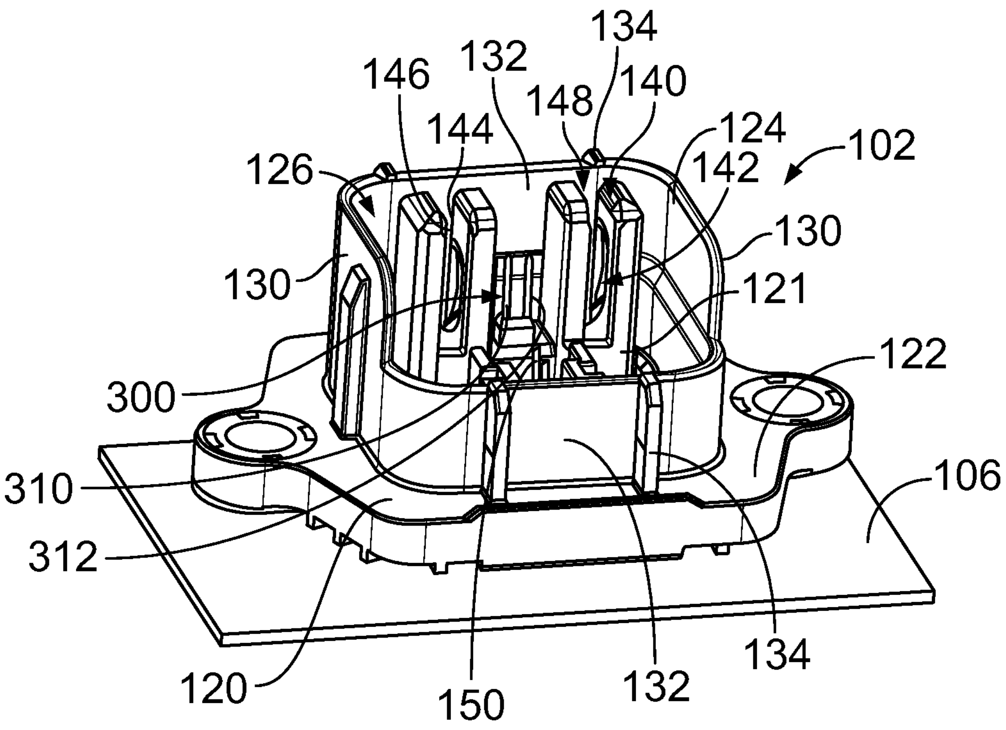
FIG. 5 is a top perspective view of the header connector in accordance with an exemplary embodiment.
Figure 6:
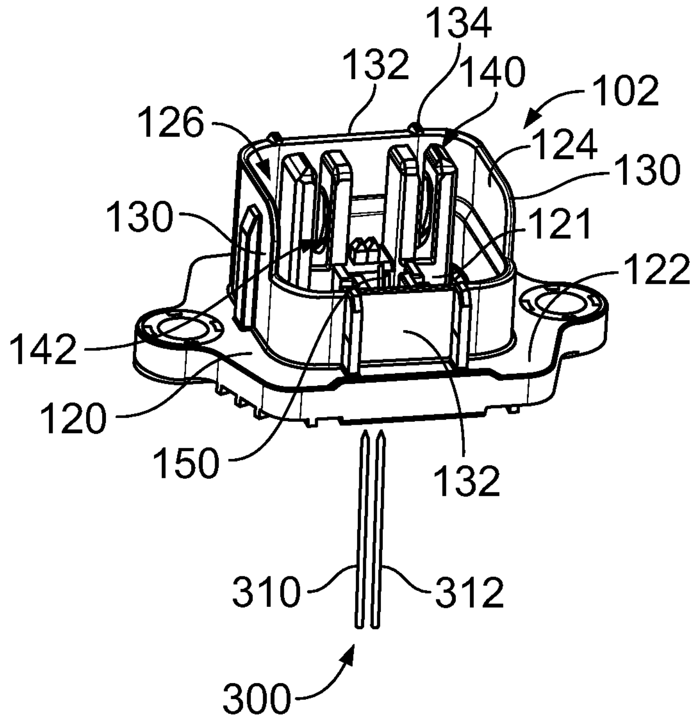
FIG. 6 is an exploded view of the header connector in accordance with an exemplary embodiment.

FIG. 5 is a top perspective view of the header connector 102 in accordance with an exemplary embodiment. FIG. 6 is an exploded view of the header connector 102 in accordance with an exemplary embodiment. The header connector 102 is shown mounted to the housing 104 and electrically connected to the circuit board 106 located within the housing 104. The header connector 102 transmits data and/or power to or from the circuit board 106.

The header connector 102 includes a header housing 120 holding header contacts 140. The header housing 120 includes a base 122 at a bottom of the header connector 102 and a shroud 124 extending from the base 122 to a top of the header connector 102. The shroud 124 surrounds a shroud chamber 126. The shroud chamber 126 is open at the top to receive a portion of the plug connector 200.

In an exemplary embodiment, the header housing 120 includes a header insert 121 holding the header contacts 140. The header insert 121 and the header contacts 140 extend into the shroud chamber 126. In various embodiments, the header insert 121 is separate and discrete from the base 122 and the shroud 124. The header insert 121 is received in an opening in the base 122 to support the header contacts 140 relative to the base 122. In other embodiments, the header insert 121 may be integral with the base 122, such as being co-molded with the base 122. In alternative embodiments, the header housing 120 may be provided without the header insert 121. For example, the base 122 may hold the header contacts 140.

In an exemplary embodiment, the shroud 124 includes side walls 130 and end walls 132 between the side walls 130, such as at a front and a rear of the header connector 102. Optionally, one of the end walls 132 is taller while the other end wall 132 is shorter and the side walls 130 may transition between the taller and shorter end walls 132. The shorter end wall 132 is provided to allow a portion of the plug connector 200, such as the plug contacts 214, to exit the shroud chamber 126. However, all of the walls may have the same height in other embodiments. In various embodiments, the corners between the side walls 130 and the end walls 132 are curved.

In an exemplary embodiment, the shroud 124 includes guide features 134 to guide mating with the plug connector 200. The guide features 134 may orient the plug connector 200 relative to the header connector 102. In the illustrated embodiment, the guide features 134 are tabs or wings extending from one or more of the walls of the shroud 124. For example, the guide features 134 may be provided at the front and rear of the header connector 102. The guide features 134 may be keyed, such as being offset, to orient the plug connector 200 relative to the header connector 102. The guide features 134 may be provided at other locations in alternative embodiments. Other types of guide features may be used in alternative embodiments.

In an exemplary embodiment, the header contacts 140 are held in the header insert 121. The header contacts 140 may be loaded into the header insert 121 through the bottom of the header insert 121. In an exemplary embodiment, the header contacts 140 are socket contacts. For example, the header contacts 140 have a socket 142 defined between contact arms 144, 146. The header contacts 140 may be arranged in a contact stack. In an exemplary embodiment, the header insert 121 includes a slot 148 aligned with the socket 142 to receive the plug contact 214. The mating ends of the header contacts 140 are exposed in the slot 148 to mate with the plug contact 214. The opposite ends of the header contacts 140 are terminated to the circuit board 106 (or a wire or cable). Other types of contacts may be used in alternative embodiments, such as pins, blades, spring beam contacts, tuning fork contacts, or other types of contacts. The header contacts 140 may be signal contacts, power contacts, ground contacts, or other types of contacts.

In an exemplary embodiment, the header connector 102 includes signal contacts 150 coupled to the header insert 121 or the header housing 120. In various embodiments, the signal contacts 150 are pilot contacts configured to form a pilot circuit. The signal contacts 150 are configured to be mated after the header contacts 140 are mated to the plug contacts 214 and are configured to be unmated prior to the header contacts 140 be unmated from the plug contacts 214. The pilot circuit may restrict transmission along the header contacts 140 when the signal contacts 150 are unmated. As such, power may be restricted from transmission through the header contacts 140 until the signal contacts 150 are mated and the power is restricted as soon as the signal contacts 150 are unmated. Other types of contacts may be provided in alternative embodiments.

In an exemplary embodiment, a portion of the eCPA assembly 300 is provided in the header connector 102. For example, a first header eCPA terminal 310 and a second header eCPA terminal 312 of the eCPA assembly 300 is provided in the header connector 102. In an exemplary embodiment, the first and second header eCPA terminals 310, 312 are fixed terminals fixed within the header connector 102 and may be referred to hereinafter as fixed terminals 310, 312. The fixed terminals 310, 312 form part of a position assurance circuit that provides an electrical guarantee that the plug connector 200 is fully mated with the header connector 102. The fixed terminals 310, 312 may be terminated to the circuit board 106 (or wires or cables). The fixed terminals 310, 312 extend into the shroud chamber 126. Optionally, the fixed terminals 310, 312 may be coupled to the header insert 121. For example, the fixed terminals 310, 312 may extend along the exterior of the header insert 121. The header insert 121 support the fixed terminals 310, 312. The fixed terminals 310, 312 may include pins at the mating end. However, fixed terminals 310, 312 may be other types of terminals in alternative embodiments.

Figure 7:
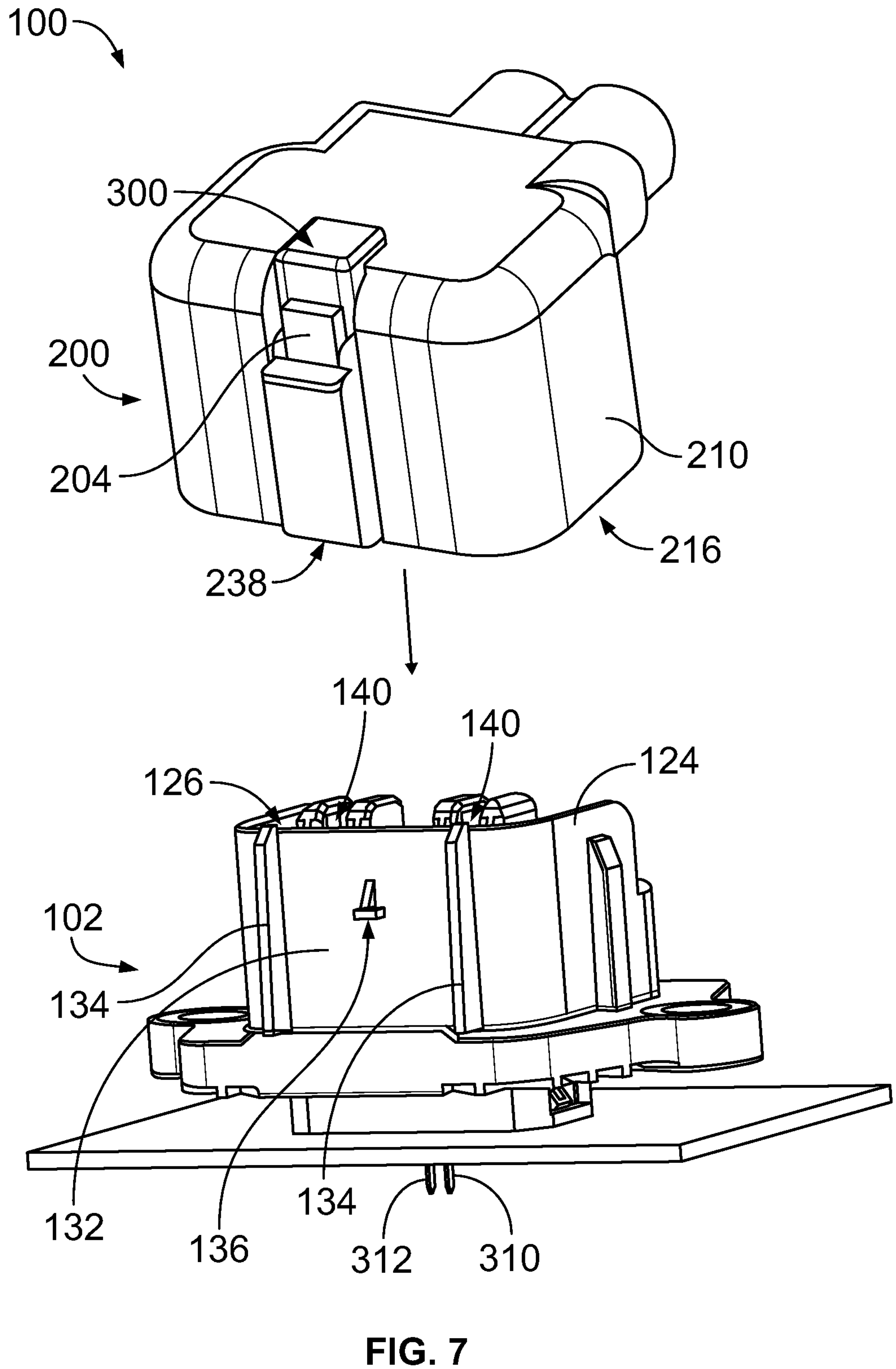
FIG. 7 is a front perspective view of the electrical connector system showing the plug connector poised for mated with the header connector in accordance with an exemplary embodiment.

FIG. 7 is a front perspective view of the electrical connector system 100 showing the plug connector 200 poised for mated with the header connector 102. During mating, the plug connector 200 is aligned with the header connector 102. The plug insert 212 (shown in FIG. 4) is configured to be plugged into the shroud chamber 126. The plug housing 210 is configured to surround the shroud 124. For example, the shroud 124 may be plugged into the cavity 216 during mating. The guide features 134 are used to orient the plug connector 200 relative to the header connector 102 and guide mating of the plug connector 200 with the header connector 102. During mating, the plug contacts 214 (shown in FIG. 4) are configured to be mated with the header contacts 140. The eCPA assembly 300 is configured to be mated with the fixed terminals 310, 312.

In an exemplary embodiment, the shroud 124 includes a latching feature 136 used for latchably coupling the plug connector 200 with the header connector 102. The latching feature 136 is configured to be coupled to the latch 204 of the plug connector 200 to securely couple the plug connector 200 to the header connector 102. The latching feature 136 may be received in the latch pocket 238 as the plug connector 200 is mated onto the header connector 102. The latch 204 interfaces with the latching feature 136 in the latch pocket 238. In the illustrated embodiment, the latching feature 136 includes a ramp-shaped protrusion extending from the exterior of the front end wall 132. Other types of latching features may be used in alternative embodiments.

The eCPA assembly 300 is operably coupled to the plug connector 200 and the header connector 102. For example, some of the components of the eCPA assembly 300 may be coupled to the plug connector 200 and some of the components of the eCPA assembly 300 may be coupled to the header connector 102. Various components of the eCPA assembly 300 may be electrically connected together during mating of the plug connector 200 with the header connector 102 to form a position assurance circuit that provides an electrical guarantee that the plug connector 200 is fully mated with the header connector 102, such as to allow operation and use of the electrical connector system 100.

Figure 8:
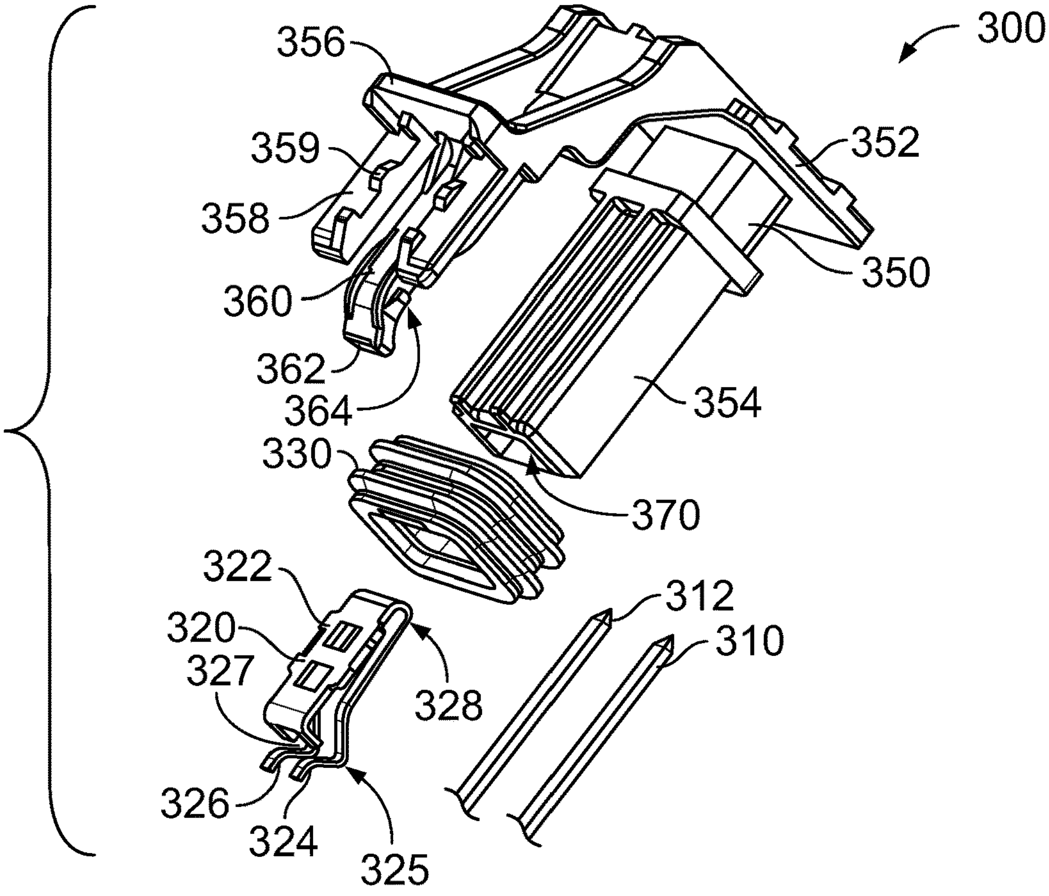
FIG. 8 is a front perspective, exploded view of the eCPA assembly in accordance with an exemplary embodiment.
Figure 9:
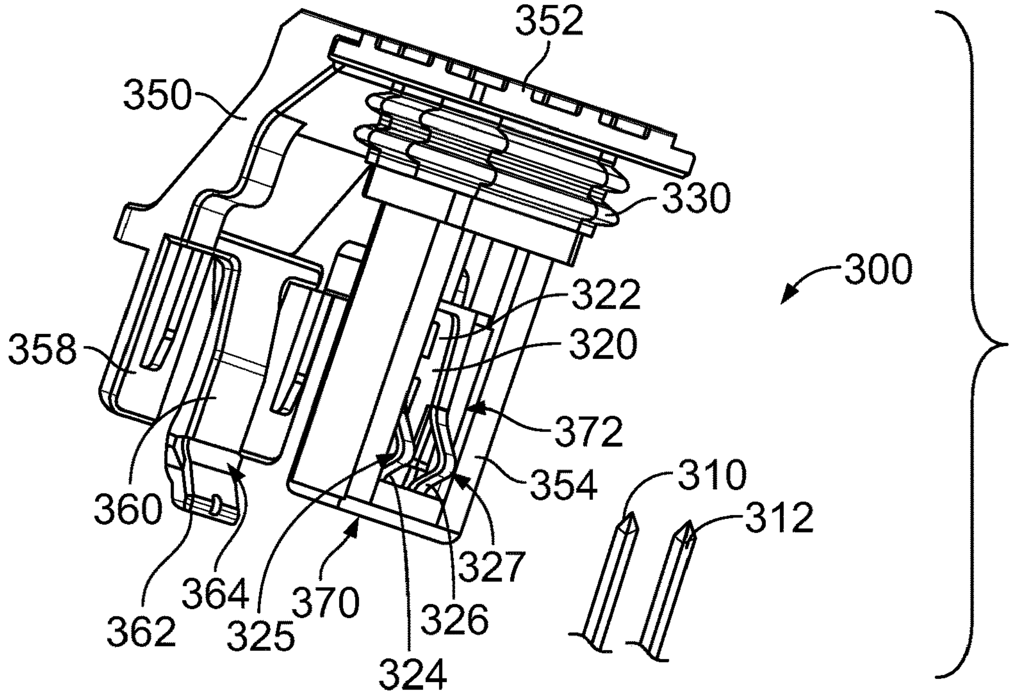
FIG. 9 is a rear perspective view of the eCPA assembly in accordance with an exemplary embodiment.

FIG. 8 is a front perspective, exploded view of the eCPA assembly 300 in accordance with an exemplary embodiment. FIG. 9 is a rear perspective view of the eCPA assembly 300 in accordance with an exemplary embodiment in an assembled state. In an exemplary embodiment, the eCPA assembly 300 includes the first fixed terminal 310, the second fixed terminal 312, an eCPA terminal 320, an actuator 350, and a seal 330. The actuator 350 holds the seal 330. The actuator 350 holds the eCPA terminal 320. The eCPA terminal 320 is configured to be electrically connected to the first and second fixed terminals 310, 312 to form an electrical short between the first and second fixed terminals 310, 312. The eCPA terminal 320 may be referred to hereinafter as a shorting terminal 320. The eCPA terminal 320 is configured to be electrically connected to the first and second fixed terminals 310, 312 to form a position assurance circuit to provide an electrical guarantee that the plug connector 200 is fully mated with the header connector 102.

In an exemplary embodiment, the shorting terminal 320 is a stamped and formed terminal. The shorting terminal 320 includes a main body 322 and mating arms 324, 326 extending from the main body 322. The mating arms 324, 326 include mating interfaces configured to engage the first and second fixed terminals 310, 312. The mating arms 324, 326 may be deflectable. The mating arms 324, 326 may be compressible, such as to be spring biased against the fixed terminals 310, 312 to maintain electrical contact with the fixed terminals 310, 312. For example, the mating arms 324, 326 may include spring portions 325, 327 at the mating interfaces. The spring portions 325, 327 may be protrusions, such as V-shaped protrusions. The spring portions 325, 327 are deflectable. Optionally, the main body 322 may include a spring portion 328 that is flexible and configured to be flexed or deflected when the mating arms 324, 326 engage the fixed terminals 310, 312, such as to induce spring pressure of the mating arms 324, 326 against the fixed terminals 310, 312 to maintain electrical contact with the fixed terminals 310, 312. For example, the main body 322 may be folded over at the spring portion 328 such that the shorting terminal 320 is generally U-shaped with the mating arms 324, 326 extending generally parallel to the main body 322. The shorting terminal 320 may have other shapes or features in alternative embodiments.

In an exemplary embodiment, the shorting terminal 320 is coupled to the actuator 350 and is movable with the actuator 350. The shorting terminal 320 is configured to be electrically connected to the first and second fixed terminals 310, 312 when the actuator 350 is moved to an actuated position. For example, only when the actuator 350 is moved to the actuated position does the shorting terminal 320 electrically connect to the first and second fixed terminals 310, 312. The position assurance circuit is closed when the shorting terminal 320 is electrically connected to the first and second fixed terminals 310, 312.

The actuator 350 includes a main body 352, such as at a top of the actuator 350. The actuator 350 includes a stuffer 354 extending from the main body 352. The actuator 350 includes a handle 356 extending from the main body 352. The handle 356 may be pushed or pulled to move the actuator 350. In various embodiments, the top of the main body 352 may be pushed by the operator to move the actuator 350. The actuator 350 includes coupling tabs 358 extending from the main body 352. The actuator 350 includes a blocking arm 360 extending from the main body 352.

In an exemplary embodiment, the blocking arm 360 is located generally at a bottom of the actuator 350. The blocking arm 360 is used for blocking the latch 204 (shown in FIG. 4) to retain the latch 204 in the latched position. For example, the blocking arm 360 is used to lock the latch 204 in the latched position. The blocking arm 360 prevents inadvertent unlatching of the latch 204. The blocking arm 360 extends to a distal end 362. The distal end 362 is configured to engage the latch 204 to position the actuator 350 relative to the latch 204. The blocking arm 360 includes a latch pocket 364 proximate to the distal end 362. The latch pocket 364 is configured to receive the latch 204 in the actuated position. In an exemplary embodiment, the blocking arm 360 is deflectable. The blocking arm 360 is movable between a blocking position and an unblocking position. The blocking arm 360 is configured to block the latch 204 in the blocking position and restrict the latch 204 from unlatching. The latch 204 is able to be unlatched when the blocking arm 360 is in the unblocking position.

In an exemplary embodiment, the coupling tabs 358 are located generally at a bottom of the actuator 350. The coupling tabs 358 are used to couple the actuator 350 to the plug housing 210. For example, the coupling tabs 358 may be received in the latch pocket 238 (shown in FIG. 4). The coupling tabs 358 may be movable within the latch pocket 238. In various embodiments, the coupling tabs 358 include locating tabs 359 configured to engage the plug housing 210 and locate the actuator 350 relative to the plug housing 210. The locating tabs 359 may be bumps or protrusions.

The handle 356 is located at a front of the actuator 350. The handle 356 is configured to be operated by the operator to move the actuator 350 between the actuated position and the retracted position. For example, the handle 356 may include surfaces that are pushed against by the operator to move the actuator 350, such as upward or downward. In various embodiments, may include gripping surfaces or gripping features that may be gripped by the operator to push or pull on the handle 356 to move the actuator 350.

The stuffer 354 is located at a rear of the actuator 350. The stuffer 354 extends downward form the main body 352 to a bottom of the actuator 350. The stuffer 354 is configured to be plugged into the plug housing 210. The stuffer 354 is configured to be located in the cavity 216 (shown in FIG. 4). In the illustrated embodiment, the stuffer 354 is oval shaped. However, the stuffer 354 may have other shapes in alternative embodiments, such as being rectangular, cylindrical, or have another shape. The seal 330 is configured to be coupled to the exterior surface of the stuffer 354. The seal 330 is configured to be sealing coupled to the stuffer 354. In an exemplary embodiment, the stuffer 354 includes a pocket 370 that receives the shorting terminal 320. The pocket 370 may be open at the bottom to receive the shorting terminal 320 through the open bottom. The stuffer 354 may include a window 372 through a side of the stuffer 354. The mating arms 324, 326 of the shorting terminal 320 are configured to extend through the window 372 to interface with the fixed terminals 310, 312.

Figure 10:
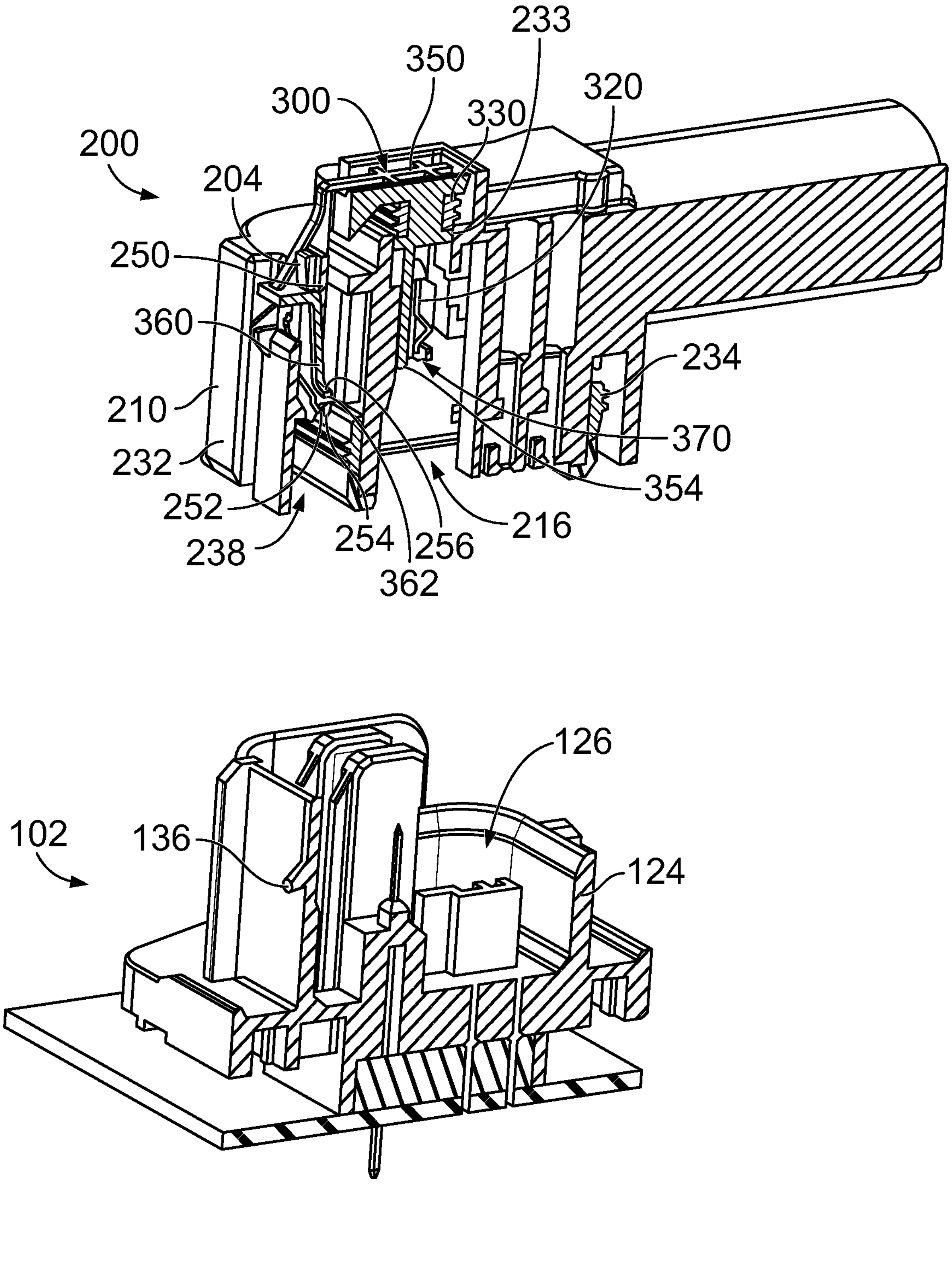
FIG. 10 is a cross-sectional view of a portion of the plug connector in accordance with an exemplary embodiment.

FIG. 10 is a cross-sectional view of the electrical connector system 100 showing a portion of the plug connector 200 and a portion of the header connector 102 in accordance with an exemplary embodiment. The plug connector 200 is mated to the header connector 102 from above. A portion of the plug connector 200 is configured to be plugged into the shroud chamber 126 of the shroud 124. The environmental seal 234 is configured to be sealed to the shroud 124. The latch 204 is used to latchably couple the plug connector 200 to the header connector 102, such as to the latching feature 136.

The actuator 350 and the shorting terminal 320 of the eCPA assembly 300 are coupled to the plug housing 210. The actuator 350 is movably coupled to the plug housing 210 and movable between a retracted position (FIG. 10) and an actuated position. The actuator 350 interacts with the latch 204. In an exemplary embodiment, the actuator 350 is configured to interface with the latch 204 in both the retracted position and the actuated position. For example, the blocking arm 360 is configured to interface with the latch 204. In an exemplary embodiment, both the latch 204 and the blocking arm 360 are located in the latch pocket 238. The stuffer 354 of the actuator 350 is received in an opening 233 in the outer wall 232 and extends into the cavity 216. The seal 330 surrounds the stuffer 354 and engages the plug housing 210 in the opening 233. The shorting terminal 320 is located in the pocket 370 and positioned in the cavity 216.

In an exemplary embodiment, the latch 204 includes a latch arm 250 and a latching beam 252. The latching beam 252 includes a tip 254 and a catch surface 256. The catch surface 256 is configured to engage the latching feature 136 to latchably secure the plug connector 200 to the header connector 102. When assembled, the blocking arm 360 is configured to interface with the latching beam 252. When the actuator 350 is in the retracted position (FIG. 10), the distal end 362 of the blocking arm 360 engages the latching beam 252. The latching beam 252 prevents the actuator 350 from moving forward to the actuated position.

Figure 11:
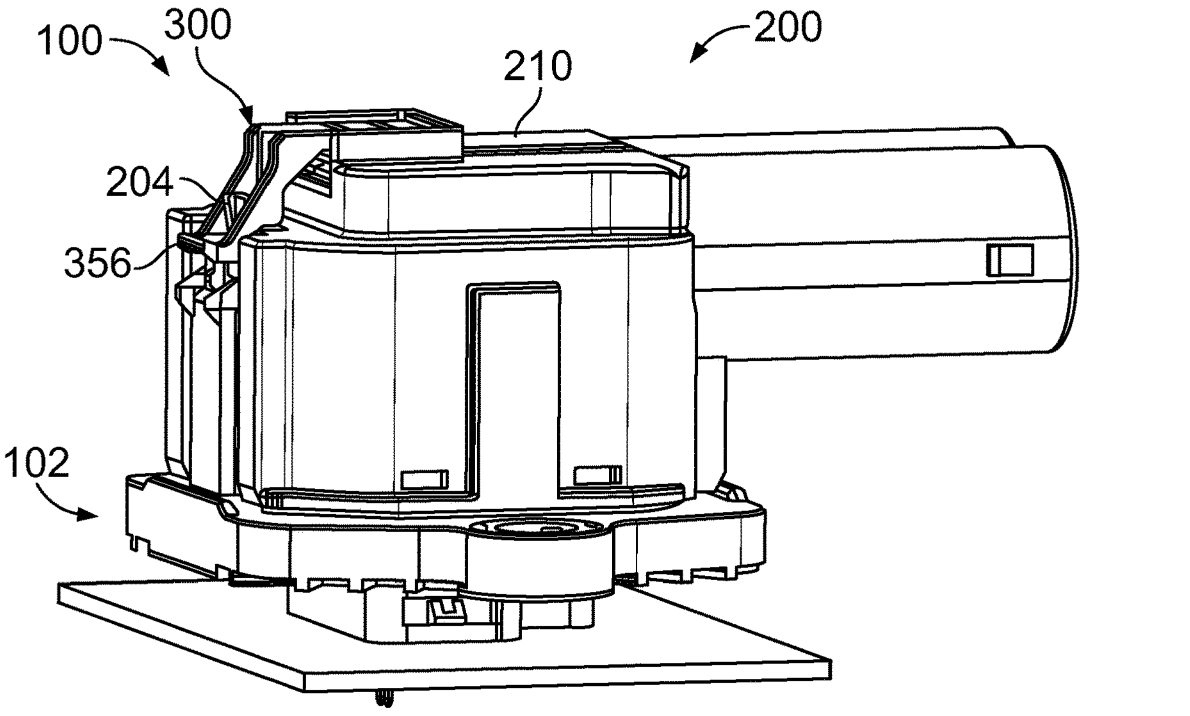
FIG. 11 is a perspective view of the electrical connector system in accordance with an exemplary embodiment showing the plug connector coupled to the header connector.
Figure 12:
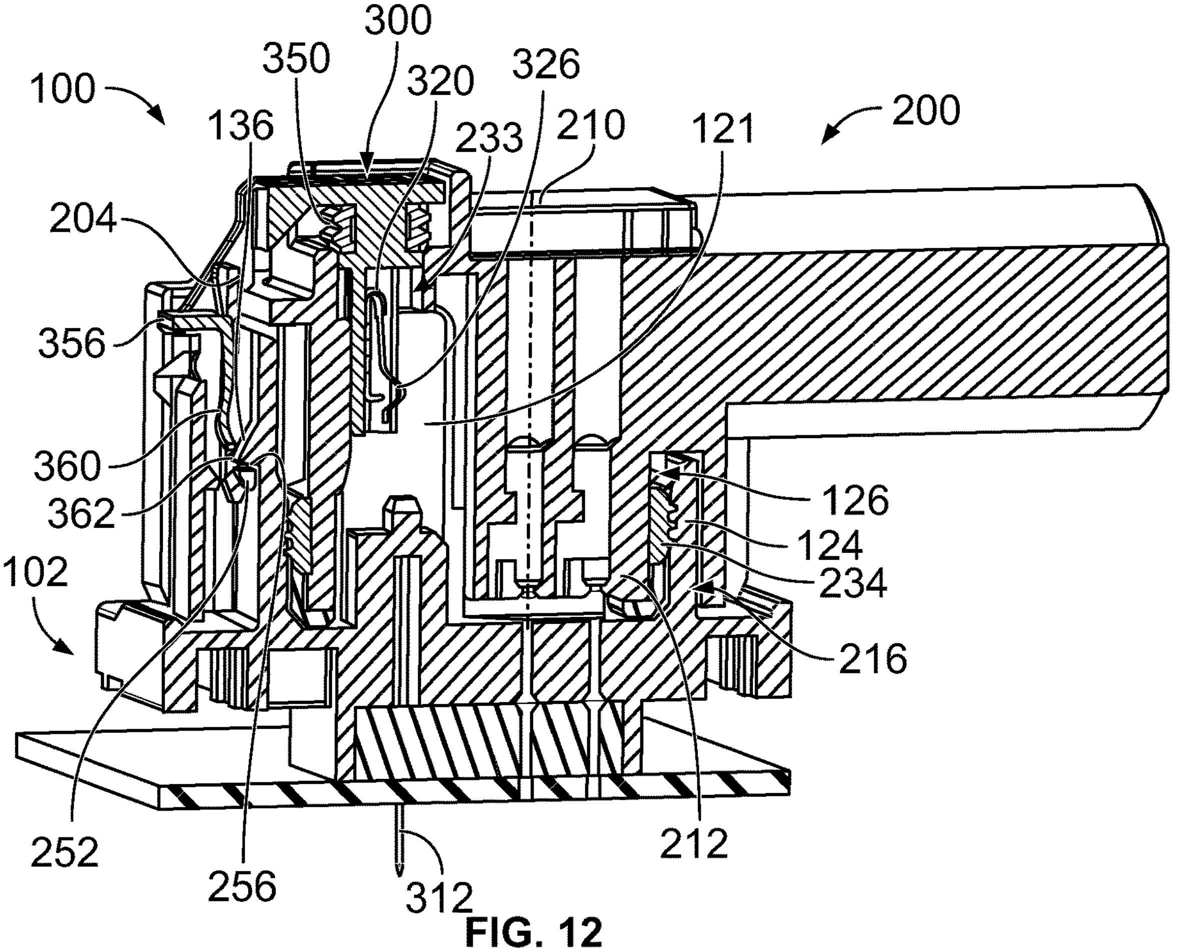
FIG. 12 is a cross-sectional view of a portion of the electrical connector system in accordance with an exemplary embodiment showing the plug connector coupled to the header connector.
Figure 13:
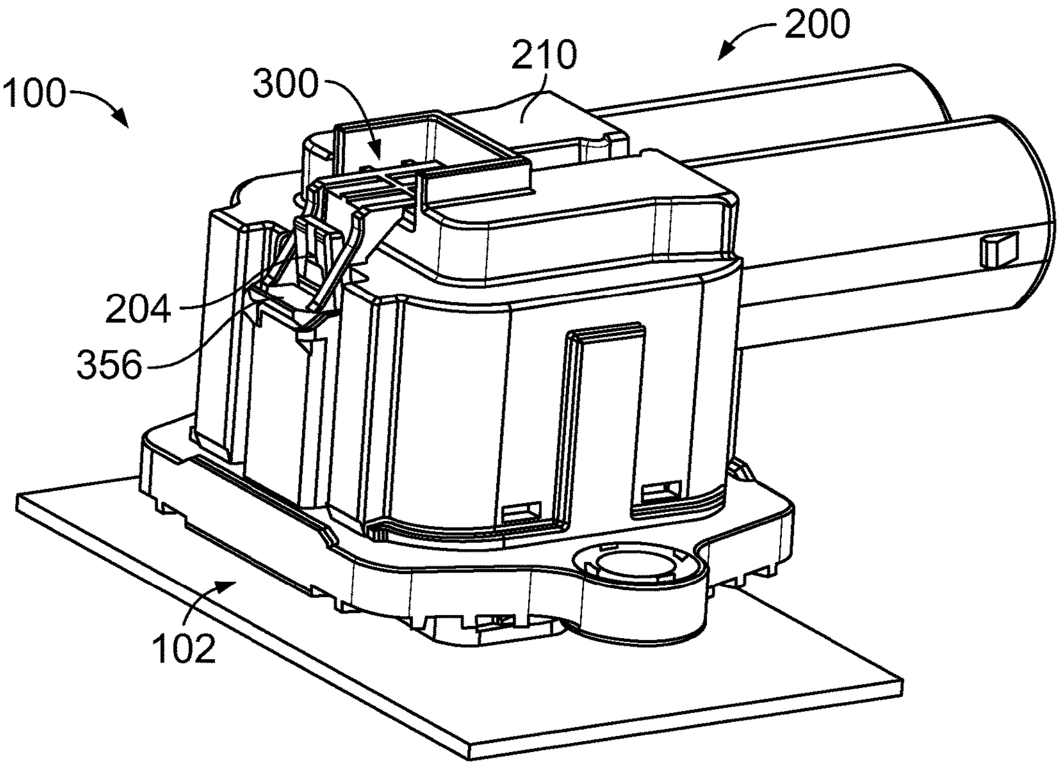
FIG. 13 is a perspective view of the electrical connector system in accordance with an exemplary embodiment showing the plug connector coupled to the header connector.
Figure 14:
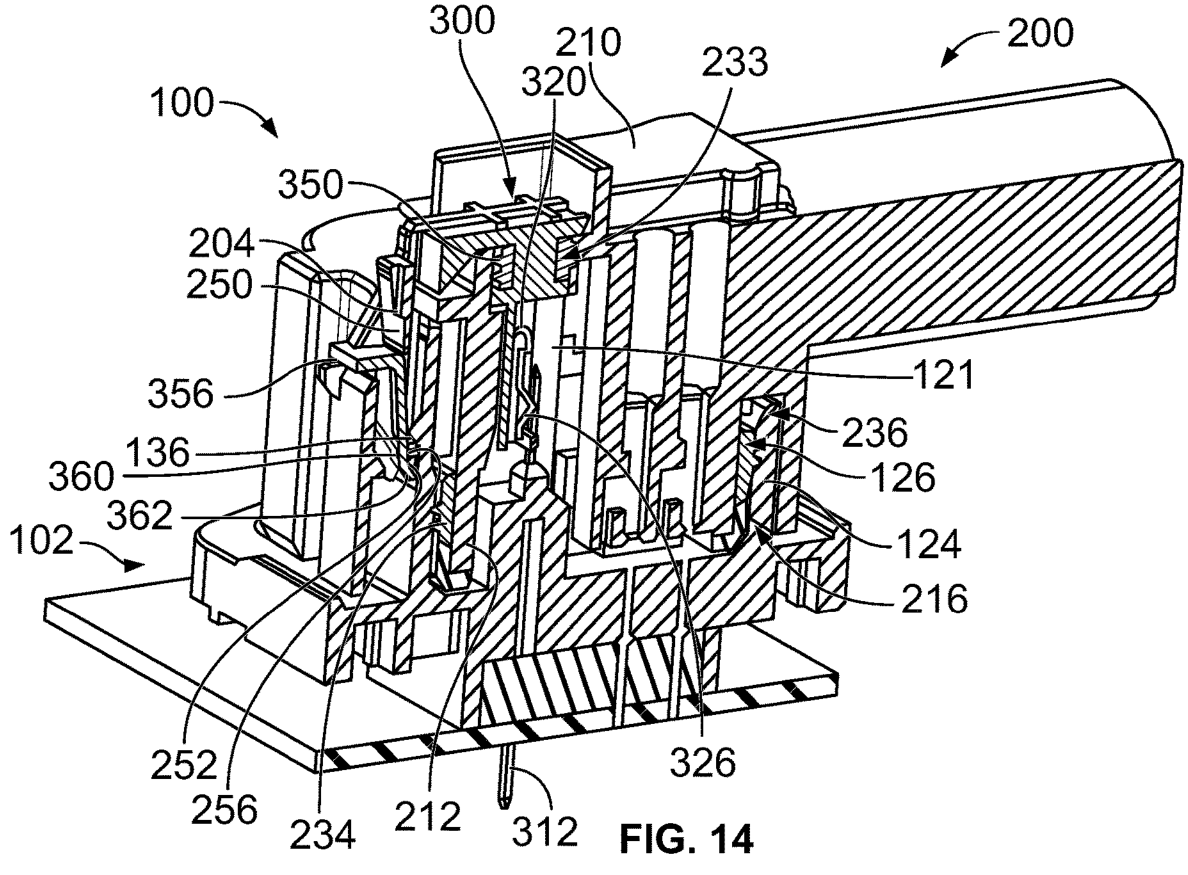
FIG. 14 is a cross-sectional view of a portion of the electrical connector system in accordance with an exemplary embodiment showing the plug connector coupled to the header connector.

FIG. 11 is a perspective view of the electrical connector system 100 in accordance with an exemplary embodiment showing the plug connector 200 coupled to the header connector 102. FIG. 12 is a cross-sectional view of a portion of the electrical connector system 100 in accordance with an exemplary embodiment showing the plug connector 200 coupled to the header connector 102. FIG. 13 is a perspective view of the electrical connector system 100 in accordance with an exemplary embodiment showing the plug connector 200 coupled to the header connector 102. FIG. 14 is a cross-sectional view of a portion of the electrical connector system 100 in accordance with an exemplary embodiment showing the plug connector 200 coupled to the header connector 102. FIGS. 11 and 12 illustrate the eCPA assembly 300 in a retracted position. The eCPA assembly 300 is in an open state (for example, the position assurance circuit is open) in the retracted position. FIGS. 13 and 14 illustrate the eCPA assembly 300 in an advanced position. The eCPA assembly 300 is in a closed state (for example, the position assurance circuit is closed) in the advanced position.

During mating, the plug connector 200 is aligned with the header connector 102. The plug insert 212 is loaded into the shroud chamber 126. The header insert 121, which is located in the shroud chamber 126, is received in the cavity 216. The header contacts 140 (shown in FIG. 5), which are held by the header insert 121, are coupled to the plug contacts 214 (shown in FIG. 4). When mated, the plug housing 210 surrounds the exterior of the shroud 124. For example, the edge of the shroud 124 is received in the seal pocket 236 to interface with the environmental seal 234 to provide a sealed interface between the plug connector 200 and the header connector 102.

When mated, the latch 204 of the plug connector 200 is coupled to the latching feature 136 of the header connector 102. For example, the latching feature 136 is configured to be latchably coupled to the catch surface 256 of the latching beam 252. The latch arm 250 is deflectable and may be pressed to move the latch 204 from a latched position (engaged with the catch surface 256) to an unlatched position (disengaged from the catch surface 256). When the eCPA assembly 300 is in the retracted position (FIGS. 11 and 12), the latch 204 is freely movable between the latched position and the unlatched position.

The eCPA assembly 300 is movably coupled to the plug housing 210. The eCPA assembly 300 is movable from the retracted position (FIGS. 11 and 12) to the actuated position (FIGS. 13 and 14). The eCPA assembly 300 may be moved to the actuated position by pushing downward on the handle 356. In the retracted position, the shorting terminal 320 is not mated to the fixed terminals 310, 312. The eCPA assembly 300 is in an open state (for example, the position assurance circuit is open). However, in the actuated position, the shorting terminal 320 is mated to the fixed terminals 310, 312. The eCPA assembly 300 is in a closed state (for example, the position assurance circuit is closed). The mating arms 324, 326 are electrically connected to the fixed terminals 310, 312 to complete or close the position assurance circuit. The eCPA assembly 300 guarantees that the plug connector 200 is fully mated with the header connector 102 because the position assurance circuit is only closed after the connectors are fully mated. The plug connector 200 can only be unmated from the header connector 102 after the eCPA assembly 300 is moved to the retracted position, thus opening the position assurance circuit, and then unlatching the latch 204 and unmating the plug connector 200 from the header connector 102.

In an exemplary embodiment, the blocking arm 360 is movable relative to the latching beam 252 when the blocking arm 360 is deflected forward, such as by the latching feature 136. The latching feature 136 deflects the blocking arm 360 forward when the latching feature 136 is aligned with the distal end 362 (for example, when the latch 204 is latchably coupled to the latching feature 136. Such deflection offsets the distal end 362 relative to the latching beam 252, which frees the eCPA assembly 300 to move to the actuated position. When the eCPA assembly 300 is in the actuated position (FIGS. 13 and 14), the blocking arm 360 extends along the latching beam 252 and blocks movement of the latching beam 252, and thus the latch 204. The blocking arm 360 blocks the latch 204 from moving from the latched position to the unlatched position. As such, the eCPA assembly 300, in the advanced position, operates as a locking device used to lock the plug connector 200 in the latched position. The eCPA assembly 300 is only movable to the actuated position when the latch 204 is in the latched position (for example, prior to being latched, the distal end 362 of the blocking arm 360 is blocked from moving to the actuated position by the latching beam 252). As such, the eCPA assembly 300 is used as an indication to the operator that the plug connector 200 is fully mated and latched.

In an exemplary embodiment, the seal 330 of the eCPA assembly 300 is sealed to the plug housing 210. In an exemplary embodiment, the seal 330 is movable within the opening 233 as the actuator 350 is moved from the retracted position to the actuated position. The seal 330 is provided at the opening 233 to provide a sealed environment for the eCPA assembly 300. The seal 330 is used to provide an environmental seal for the shroud chamber 126 and the contacts within the shroud chamber 126.

Figure 15:
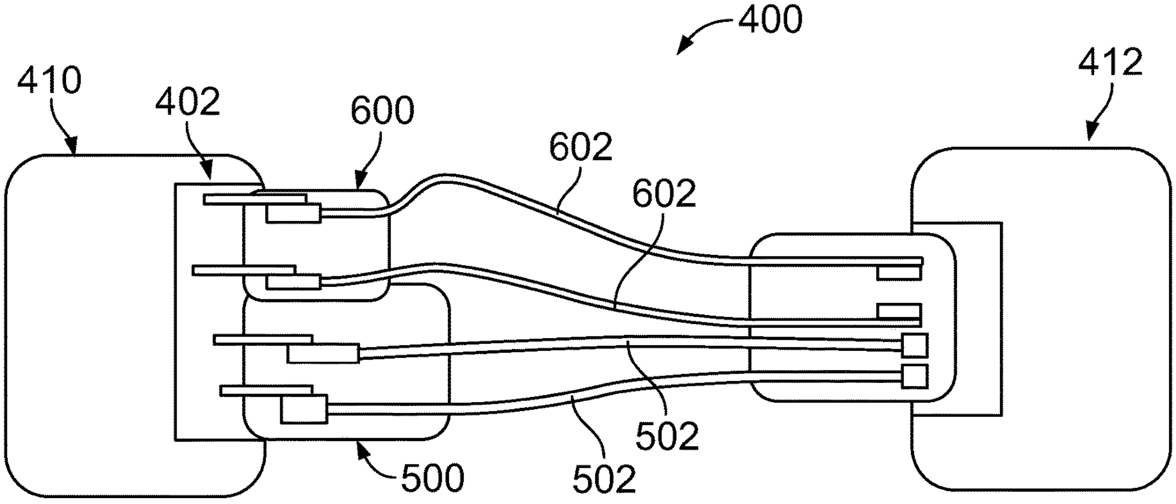
FIG. 15 is a schematic view of an electrical connector system in accordance with an exemplary embodiment.

FIG. 15 is a schematic view of an electrical connector system 400 in accordance with an exemplary embodiment. The electrical connector system 400 includes a header connector 402 and a plug connector 500 removably coupled to the header connector 402. In an exemplary embodiment, the electrical connector system 400 includes an eCPA assembly 600 operable to electrically assure or guarantee that the connectors 402, 500 are fully mated and properly latched together.

The header connector 402 is coupled to a first electrical device 410, such as to supply power to the first electrical device 410. In an exemplary embodiment, the plug connector 500 is a cable connector. For example, the plug connector 500 is terminated to ends of cables 502. The cables 502 may be power cables used to supply power to the plug connector 500, and thus the header connector 402 through the plug connector 500. The cables 502 extend from the plug connector 500 to a second electrical device 412. In an exemplary embodiment, the second electrical device 412 is remote from the first electrical device 410. For example, the electrical devices 410, 412 may be located in different areas of the vehicle. The second electrical device 412 may be referred to hereinafter as a remote electrical device 412.

In an exemplary embodiment, the eCPA assembly 600 includes one or more eCPA wires 602 extending between the electrical devices 410, 412. The eCPA wires 602 transmit eCPA signals from the first electrical device 410 to the second electrical device 412. The eCPA signals may be used to control operation of the first electrical device 410 and/or the second electrical device 412. For example, the eCPA signals may control a power supply from the second electrical device 412 to the first electrical device 410. As such, power is not supplied to the first electrical device 410 until the eCPA assembly 600 is properly mated and the position assurance circuit is complete.

In various embodiments, the first electrical device 410 and the second electrical device 412 are vehicle devices used within a vehicle, such as an automobile. The first electrical device 410 and/or the second electrical device 412 may be part of the battery system of the vehicle. For example, the second electrical device 412 may be part of or connected to the battery or the battery distribution unit of the vehicle to supply power to other components of the vehicle, such as the first electrical device 410. In various embodiments, the first electrical device 410 may be a motor, such as a drive motor of the vehicle or another motor in the vehicle, such as a window motor, a mirror motor, a seat motor, and the like. In other various embodiments, the first electrical device 410 and/or the second electrical device 412 may be part of a safety system of the vehicle, such as the airbag system of the vehicle. For example, the first electrical device 410 may be part of the airbag system sued to deploy the airbag and the second electrical device 412 may be part of the airbag controller.

Figure 16:
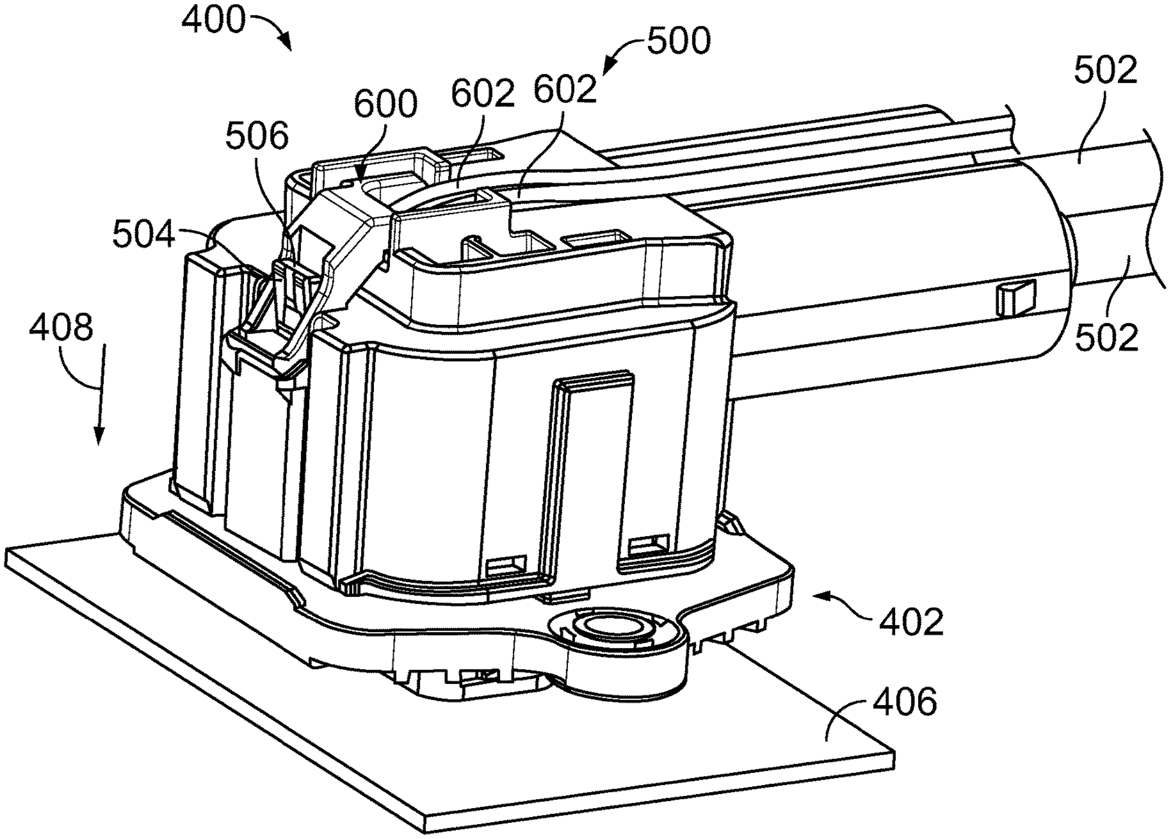
FIG. 16 is a top perspective view of the electrical connector system in accordance with an exemplary embodiment in a mated state.
Figure 17:
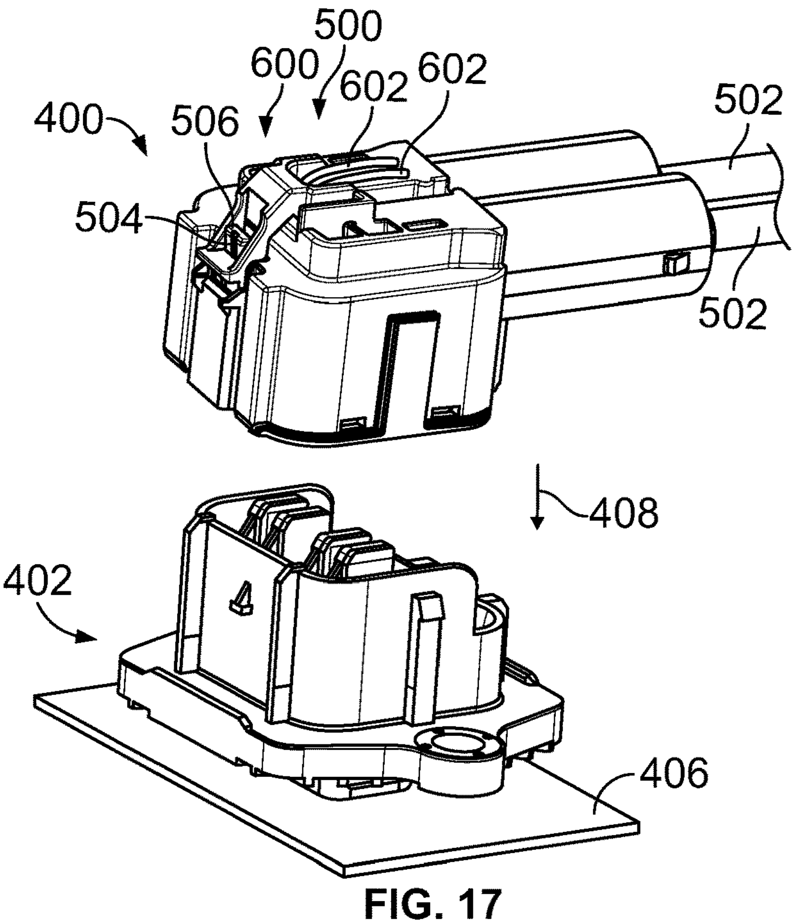
FIG. 17 is a top perspective view of the electrical connector system in accordance with an exemplary embodiment in an unmated state.

FIG. 16 is a top perspective view of the electrical connector system 400 in accordance with an exemplary embodiment in a mated state. FIG. 17 is a top perspective view of the electrical connector system 400 in accordance with an exemplary embodiment in an unmated state. The electrical connector system 400 includes the header connector 402, the plug connector 500 removably coupled to the header connector 402, and the eCPA assembly 600 operably coupled to the header connector 402 and the plug connector 500. The eCPA assembly 600 is operable to electrically assure or guarantee that the connectors 402, 500 are fully mated and properly latched together. In an exemplary embodiment, the eCPA assembly 600 is a sealed assembly providing a sealed interface for the connectors. For example, the electrical components of the eCPA assembly 600 are contained within a sealed environment.

In an exemplary embodiment, the header connector 402 may be similar to or identical to the header connector 102 (shown in FIG. 1). In an exemplary embodiment, the plug connector 500 may be similar to or identical to the plug connector 200 (shown in FIG. 1). In an exemplary embodiment, the eCPA assembly 600 may be similar to the eCPA assembly 300 (shown in FIG. 1); however, the eCPA assembly 600 includes the eCPA wires 602 to send the eCPA signals to a remote device, for example, the second electrical device 412 (shown in FIG. 15).

The electrical connector system 400 may be used within a harsh environment, such as within a vehicle. The electrical connector system 400 may be exposed to moisture, dirt, debris, vibration, shock, and the like. In an exemplary embodiment, the header connector 402 is mounted to the vehicle, such as to a chassis or frame of the vehicle. The header connector 402 may be mounted to a component of the vehicle, such as the battery module or other electrical component of the vehicle. The header connector 402 may be electrically connected to an electrical component of the vehicle, such as the battery module. In an exemplary embodiment, the header connector 402 may be electrically connected to a circuit board 406 in the first electrical device 410 (shown in FIG. 1). The header connector 402 may transmit data and/or power to or from the circuit board 406. In alternative embodiments, the header connector 402 may be a cable connector rather than a board connector. For example, the header connector 402 may be provided at ends of cables (not shown).

The plug connector 500 is removably coupled to the header connector 402. The plug connector 500 is configured to be mated to the header connector 402 in a mating direction 408 (for example, a vertical direction). In an exemplary embodiment, the plug connector 500 is a cable connector. For example, the plug connector 500 is terminated to ends of the cables 502, which extend from the plug connector 500 and are routed to a remote electrical device, such as the second electrical device 412.

In an exemplary embodiment, the plug connector 500 includes a latch 504 for latchably coupling the plug connector 500 to the header connector 402. The latch 504 prevents inadvertent unmating of the plug connector 500 from the header connector 402. The latch 504 may be unlatched by an operator to unmate the plug connector 500 from the header connector 402. For example, the latch 504 may be movable between a latched position and an unlatched position. The latch 504 may be rotated or pivoted to the unlatched position, such as by pressing against an actuation end 506 of the latch 504. In an exemplary embodiment, the eCPA assembly 600 is configured to be operably coupled to the latch 504. The eCPA assembly 600 is used as a secondary lock for the latch 504. The eCPA assembly 600 may be used to back up the latch 504 and prevent the latch 504 from moving to the unlatched position when the eCPA assembly 600 is engaged. In various embodiments, the eCPA assembly 600 may only be engaged with the latch 504 when the plug connector 500 is in the latched position. As such, the eCPA assembly 600 ensures that the plug connector 500 is fully mated and remains mated at all times while the eCPA assembly 600 is engaged.

The eCPA assembly 600 creates a position assurance circuit that is only activated when the latch 504 is in the latched position and the eCPA assembly 600 is actuated. For example, the position assurance circuit may be a normally open circuit and the position assurance circuit is closed or made when the eCPA assembly 600 is actuated. The eCPA signals are transmitted along the eCPA wires 602 when the eCPA assembly 600 is actuated and the position assurance circuit is closed or made. In other embodiments, the position assurance circuit may be a normally closed circuit and the position assurance circuit is open or short circuited when the eCPA assembly 600 is actuated. The operation of the electrical connector system 400 may be controlled by the eCPA assembly 600. For example, power or signals may not be transmitted through the electrical connector system 400 unless and until the position assurance circuit is closed (or opened depending on the particular arrangement). As such, normal operation of the electrical connector system 400 only occurs when the plug connector 500 is fully mated with the header connector 402.

Figure 18:
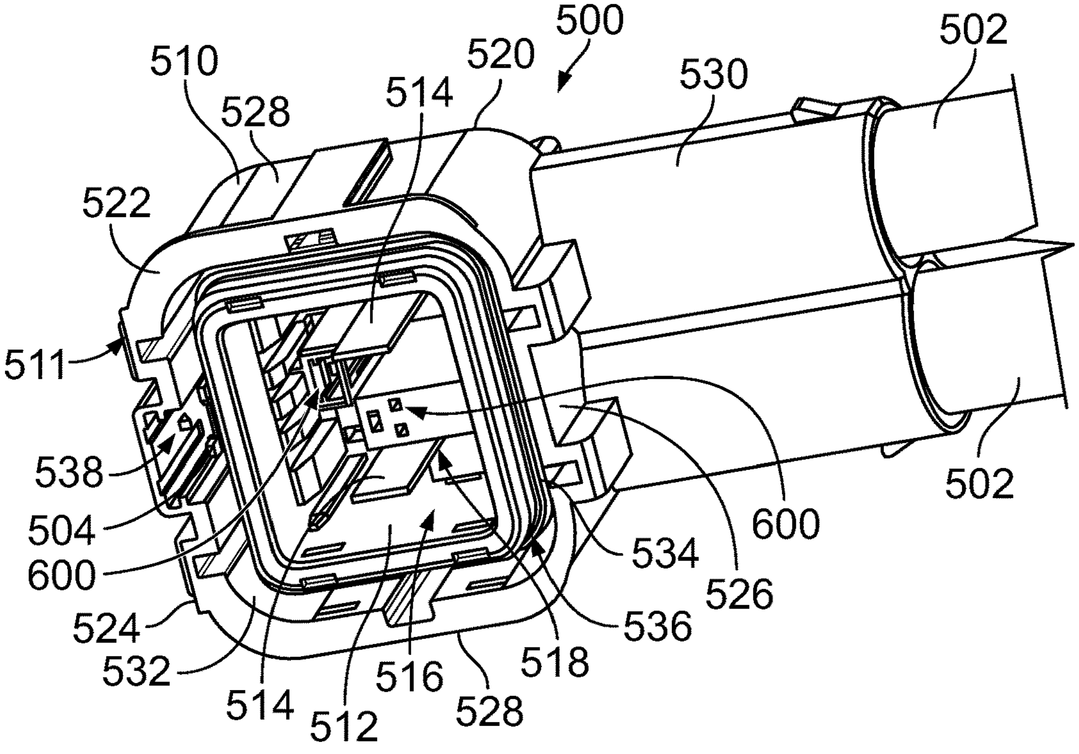
FIG. 18 is a bottom perspective view of the plug connector in accordance with an exemplary embodiment.

FIG. 18 is a bottom perspective view of the plug connector 500 in accordance with an exemplary embodiment. The plug connector 500 includes a plug housing 510 holding plug contacts 514. In an exemplary embodiment, the plug contacts 514 are planar blade contacts. However, other types of contacts may be used in alternative embodiments, such as sockets, pins, spring contacts, beam contacts, or other types of contacts. The cables 502 are coupled to the plug contacts 514 and extend from the plug housing 510 to a remote component. The latch 504 extends from the plug housing 510. The latch 504 may be integral with the plug housing 510. The eCPA assembly 600 is coupled to the plug housing 510.

The plug housing 510 may be manufactured from a dielectric material, such as a plastic material. The plug housing 510 may be a molded part. The plug housing 510 includes a mating end 511 configured to be plugged into the header connector 402. In an exemplary embodiment, the plug housing 510 includes a plug insert 512 defining the mating end 511, which is configured to be plugged into the header connector 402. The plug insert 512 may be integral with the plug housing 510, such as being molded with the plug housing 510. In other embodiments, the plug insert 512 may be separate from the plug housing 510 and coupled to the plug housing 510. In alternative embodiments, the plug housing 510 may be provided without a plug insert 512. In an exemplary embodiment, the plug housing 510 includes a cavity 516, which is configured to receive a portion of the header connector 402. The plug insert 512 holds the plug contacts 514, such as in contact channels 518. The plug contacts 514 extend into the cavity 516 for mating with the header connector 402.

The plug housing 510 extends between a top 520 and a bottom 522. The plug housing 510 includes a front 524 and a rear 526. The plug housing 510 includes sides 528 extending between the front 524 and the rear 526. In the illustrated embodiment, the latch 504 is provided at the front 524. Other locations are possible in alternative embodiments, such as at one or both of the sides 528. In the illustrated embodiment, the cables 502 extend from the rear 526, such as through cable bores passing through a cable ferrule 530 at the rear 526. Other locations are possible in alternative embodiments, such as the top 520. In an exemplary embodiment, the bottom 522 defines a mating end of the plug connector 500. The cavity 516 is open at the bottom 522 to receive the header connector 402.

In an exemplary embodiment, the plug housing 510 includes an outer wall 532 that surrounds the plug insert 512. The outer wall 532 may be generally box shaped. In an exemplary embodiment, an environmental seal 534 is received in a seal pocket 536 between the outer wall 532 and the plug insert 512. The seal 534 is configured to be sealed to the outer wall 532 and/or the plug insert 512 and is configured to be sealed to the header connector 402. The seal 534 provides environmental sealing at the interface between the plug connector 500 and the header connector 402, such as to prevent moisture or debris from entering the cavity 516.

In an exemplary embodiment, the plug housing 510 includes a latch pocket 538 at the front 524. The latch 504 is located in the latch pocket 538. In an exemplary embodiment, a portion of the eCPA assembly 600 extends into the latch pocket 538. The latch pocket 538 may be open at the bottom 522, such as to receive a latching portion of the header connector 402.

Figure 19:
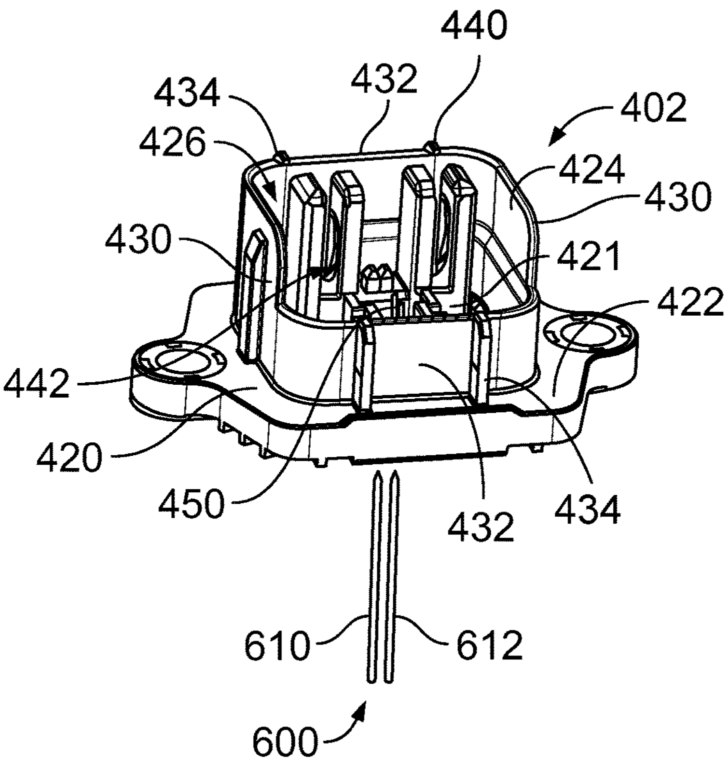
FIG. 19 is an exploded view of the header connector in accordance with an exemplary embodiment.

FIG. 19 is an exploded view of the header connector 402 in accordance with an exemplary embodiment. The header connector 402 includes a header housing 420 holding header contacts 440. The header housing 420 includes a base 422 at a bottom of the header connector 402 and a shroud 424 extending from the base 422 to a top of the header connector 402. The shroud 424 surrounds a shroud chamber 426. The shroud chamber 426 is open at the top to receive a portion of the plug connector 500.

In an exemplary embodiment, the header housing 420 includes a header insert 421 holding the header contacts 440. The header insert 421 and the header contacts 440 extend into the shroud chamber 426. In various embodiments, the header insert 421 is separate and discrete from the base 422 and the shroud 424. The header insert 421 is received in an opening in the base 422 to support the header contacts 440 relative to the base 422. In other embodiments, the header insert 421 may be integral with the base 422, such as being co-molded with the base 422. In alternative embodiments, the header housing 420 may be provided without the header insert 421. For example, the base 422 may hold the header contacts 440.

In an exemplary embodiment, the shroud 424 includes side walls 430 and end walls 432 between the side walls 430, such as at a front and a rear of the header connector 402. Optionally, one of the end walls 432 is taller while the other end wall 432 is shorter and the side walls 430 may transition between the taller and shorter end walls 432. The shorter end wall 432 is provided to allow a portion of the plug connector 500, such as the plug contacts 514, to exit the shroud chamber 426. However, all of the walls may have the same height in other embodiments. In various embodiments, the corners between the side walls 430 and the end walls 432 are curved.

In an exemplary embodiment, the shroud 424 includes guide features 434 to guide mating with the plug connector 500. The guide features 434 may orient the plug connector 500 relative to the header connector 402. In the illustrated embodiment, the guide features 434 are tabs or wings extending from one or more of the walls of the shroud 424. For example, the guide features 434 may be provided at the front and rear of the header connector 402. The guide features 434 may be keyed, such as being offset, to orient the plug connector 500 relative to the header connector 402. The guide features 434 may be provided at other locations in alternative embodiments. Other types of guide features may be used in alternative embodiments.

In an exemplary embodiment, the header contacts 440 are held in the header insert 421. The header contacts 440 may be loaded into the header insert 421 through the bottom of the header insert 421. In an exemplary embodiment, the header contacts 440 are socket contacts. For example, the header contacts 440 have a socket 442 defined between contact arms. The header contacts 440 may be arranged in a contact stack. In an exemplary embodiment, the header insert 421 includes a slot 448 aligned with the socket 442 to receive the plug contact 514. The mating ends of the header contacts 440 are exposed in the slot 448 to mate with the plug contact 514. The opposite ends of the header contacts 440 are terminated to the circuit board 406 (or a wire or cable). Other types of contacts may be used in alternative embodiments, such as pins, blades, spring beam contacts, tuning fork contacts, or other types of contacts. The header contacts 440 may be signal contacts, power contacts, ground contacts, or other types of contacts.

In an exemplary embodiment, a portion of the eCPA assembly 600 is provided in the header connector 402. For example, a first header eCPA terminal 610 and a second header eCPA terminal 612 of the eCPA assembly 600 is provided in the header connector 402. In an exemplary embodiment, the first and second header eCPA terminals 610, 612 are fixed terminals fixed within the header connector 402 and may be referred to hereinafter as fixed terminals 610, 612. The fixed terminals 610, 612 form part of a position assurance circuit that provides an electrical guarantee that the plug connector 500 is fully mated with the header connector 402. The fixed terminals 610, 612 may be terminated to the circuit board 406 (or wires or cables). The fixed terminals 610, 612 extend into the shroud chamber 426. Optionally, the fixed terminals 610, 612 may be coupled to the header insert 421. For example, the fixed terminals 610, 612 may extend along the exterior of the header insert 421. The header insert 421 support the fixed terminals 610, 612. The fixed terminals 610, 612 may include pins at the mating end. However, fixed terminals 610, 612 may be other types of terminals in alternative embodiments.

With additional reverence to FIG. 18, during mating, the plug connector 500 is aligned with the header connector 402. The plug insert 512 is configured to be plugged into the shroud chamber 426. The plug housing 510 is configured to surround the shroud 424. For example, the shroud 424 may be plugged into the cavity 516 during mating. The guide features 434 are used to orient the plug connector 500 relative to the header connector 402 and guide mating of the plug connector 500 with the header connector 402. During mating, the plug contacts 514 are configured to be mated with the header contacts 440. The eCPA assembly 600 is configured to be mated with the fixed terminals 610, 612.

In an exemplary embodiment, the shroud 424 includes a latching feature 436 used for latchably coupling the plug connector 500 with the header connector 402. The latching feature 436 is configured to be coupled to the latch 504 of the plug connector 500 to securely couple the plug connector 500 to the header connector 402. The latching feature 436 may be received in the latch pocket 538 as the plug connector 500 is mated onto the header connector 402. The latch 504 interfaces with the latching feature 436 in the latch pocket 538. In the illustrated embodiment, the latching feature 436 includes a ramp-shaped protrusion extending from the exterior of the front end wall 432. Other types of latching features may be used in alternative embodiments.

The eCPA assembly 600 is operably coupled to the plug connector 500 and the header connector 402. For example, some of the components of the eCPA assembly 600 may be coupled to the plug connector 500 and some of the components of the eCPA assembly 600 may be coupled to the header connector 402. Various components of the eCPA assembly 600 may be electrically connected together during mating of the plug connector 500 with the header connector 402 to form a position assurance circuit that provides an electrical guarantee that the plug connector 500 is fully mated with the header connector 402, such as to allow operation and use of the electrical connector system 400.

Figure 20:
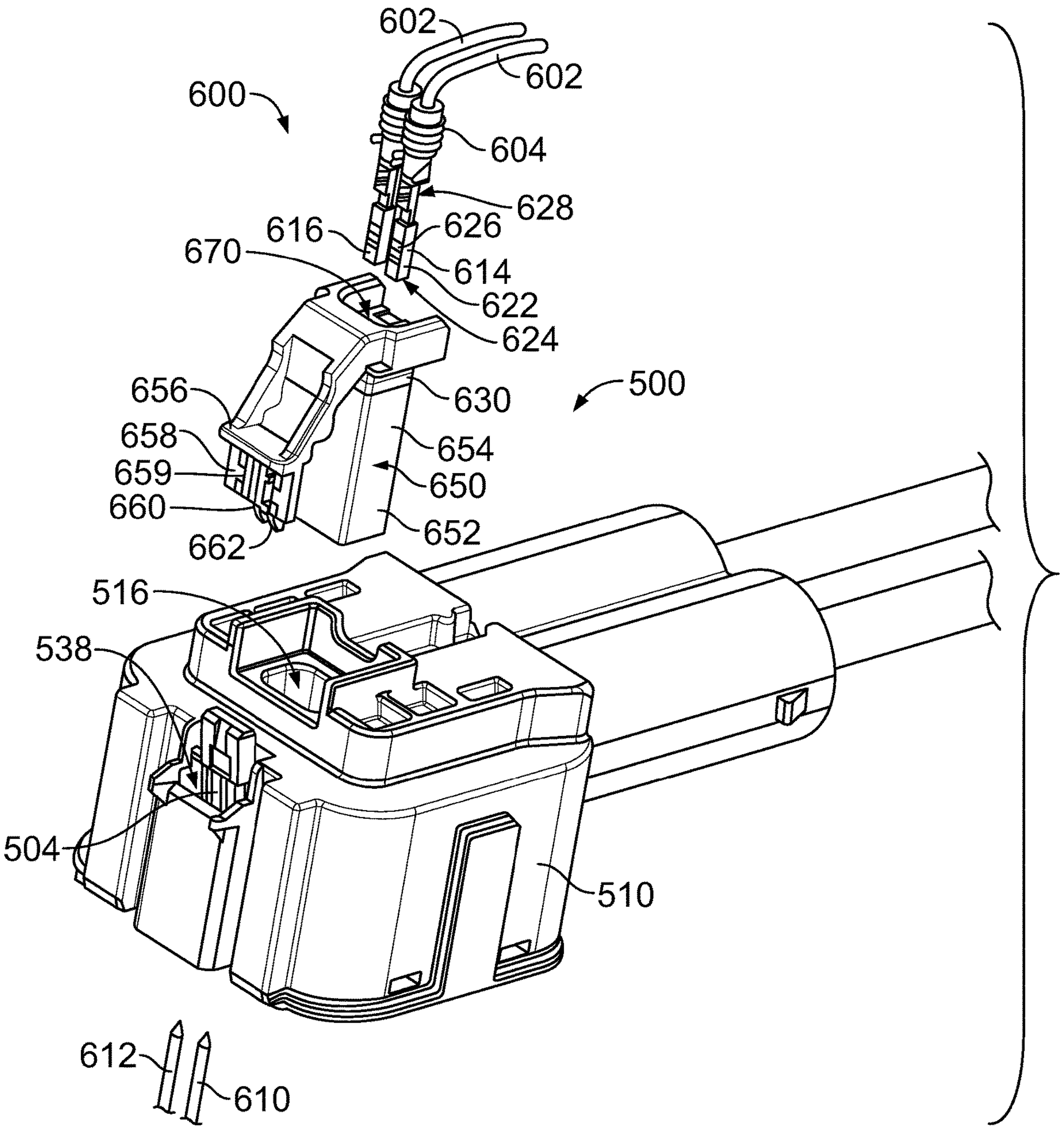
FIG. 20 is an exploded view of the plug connector showing the eCPA assembly in accordance with an exemplary embodiment.

FIG. 20 is an exploded view of the plug connector 500 showing the eCPA assembly 600 in accordance with an exemplary embodiment. The eCPA assembly 600 includes one or more header eCPA terminals, such as the first and second header eCPA terminals 610, 612, which may be part of the header connector 402 (shown in FIG. 19). In an exemplary embodiment, the eCPA assembly 600 includes one or more plug eCPA terminals, such as a first plug eCPA terminal 614 and a second plug eCPA terminal 616 corresponding to the first and second header eCPA terminals 610, 612. In an exemplary embodiment, the eCPA assembly 600 includes an actuator 650 and a seal 630. The actuator 650 holds the seal 630. The actuator 650 holds the eCPA terminals 614, 616. The plug eCPA terminals 614, 616 may be identical to each other. The plug eCPA terminals 614, 616 are configured to be electrically connected to the first and second header eCPA terminals 610, 612 to form electrical circuits with the first and second header eCPA terminals 610, 612. The plug eCPA terminals 614, 616 are terminated to ends of the eCPA wires 602. The eCPA terminals 610, 612, 614, 616 and the eCPA wires 602 form a position assurance circuit(s) to provide an electrical guarantee that the plug connector 500 is fully mated with the header connector 402.

In an exemplary embodiment, each plug eCPA terminal 614, 616 is a stamped and formed terminal. The plug eCPA terminal 614, 616 includes a main body 622 forming a socket 624 that receives the corresponding fixed terminal 610, 612 (for example, pin). The main body 622 includes at least one mating arm 626 extending from the main body 622 into the socket 624. The mating arm 626 includes a mating interface configured to engage the corresponding fixed terminal 610, 612. The mating arm 626 may be deflectable. The mating arm 626 may be compressible, such as to be spring biased against the fixed terminal 610, 612 to maintain electrical contact with the fixed terminal 610, 612. The plug eCPA terminals 614, 616 may have other shapes or features in alternative embodiments.

In an exemplary embodiment, each plug eCPA terminal 614, 616 includes a terminating end 628. The terminating end 628 is configured to be terminated to the eCPA wires 602. In various embodiments, the terminating end 628 includes a crimp barrel configured to be crimped to the end of the eCPA wire 602. Other types of connections may be used in alternative embodiments at the terminating end 628, such as a pad for welding or soldering to the end of the eCPA wire 602. In an exemplary embodiment, the eCPA wire 602 includes a wire seal 604 at the end of the eCPA wire 602. The terminating end 628 may be connected to the wire seal 604. For example, the crimp barrel may be crimped to the wire seal 604.

In an exemplary embodiment, the plug eCPA terminals 614, 616 are coupled to the actuator 650 and are movable with the actuator 650. The plug eCPA terminals 614, 616 are configured to be electrically connected to the first and second fixed terminals 610, 612 when the actuator 650 is moved to an actuated position. For example, only when the actuator 650 is moved to the actuated position do the plug eCPA terminals 614, 616 electrically connect to the first and second fixed terminals 610, 612. The position assurance circuit is closed when the plug eCPA terminals 614, 616 are electrically connected to the first and second fixed terminals 610, 612.

The actuator 650 includes a main body 652, such as at a top of the actuator 650. The actuator 650 includes a stuffer 654 extending from the main body 652. The actuator 650 includes a handle 656 extending from the main body 652. The handle 656 may be pushed or pulled to move the actuator 650. In various embodiments, the top of the main body 652 may be pushed by the operator to move the actuator 650. The actuator 650 includes coupling tabs 658 extending from the main body 652. The actuator 650 includes a blocking arm 660 extending from the main body 652.

In an exemplary embodiment, the blocking arm 660 is located generally at a bottom of the actuator 650. The blocking arm 660 is used for blocking the latch 504 (shown in FIG. 4) to retain the latch 504 in the latched position. For example, the blocking arm 660 is used to lock the latch 504 in the latched position. The blocking arm 660 prevents inadvertent unlatching of the latch 504. The blocking arm 660 extends to a distal end 662. The distal end 662 is configured to engage the latch 504 to position the actuator 650 relative to the latch 504. The blocking arm 660 includes a latch pocket proximate to the distal end 662. The latch pocket is configured to receive the latch 504 in the actuated position. In an exemplary embodiment, the blocking arm 660 is deflectable. The blocking arm 660 is movable between a blocking position and an unblocking position. The blocking arm 660 is configured to block the latch 504 in the blocking position and restrict the latch 504 from unlatching. The latch 504 is able to be unlatched when the blocking arm 660 is in the unblocking position.

In an exemplary embodiment, the coupling tabs 658 are located generally at a bottom of the actuator 650. The coupling tabs 658 are used to couple the actuator 650 to the plug housing 510. For example, the coupling tabs 658 may be received in the latch pocket 538. The coupling tabs 658 may be movable within the latch pocket 538. In various embodiments, the coupling tabs 658 include locating tabs 659 configured to engage the plug housing 510 and locate the actuator 650 relative to the plug housing 510. The locating tabs 659 may be bumps or protrusions.

The handle 656 is located at a front of the actuator 650. The handle 656 is configured to be operated by the operator to move the actuator 650 between the actuated position and the retracted position. For example, the handle 656 may include surfaces that are pushed against by the operator to move the actuator 650, such as upward or downward. In various embodiments, may include gripping surfaces or gripping features that may be gripped by the operator to push or pull on the handle 656 to move the actuator 650.

The stuffer 654 is located at a rear of the actuator 650. The stuffer 654 extends downward form the main body 652 to a bottom of the actuator 650. The stuffer 654 is configured to be plugged into the plug housing 510. The stuffer 654 is configured to be located in the cavity 516. In the illustrated embodiment, the stuffer 654 is oval shaped. However, the stuffer 654 may have other shapes in alternative embodiments, such as being rectangular, cylindrical, or have another shape. The seal 630 is configured to be coupled to the exterior surface of the stuffer 654. The seal 630 is configured to be sealing coupled to the stuffer 654. In an exemplary embodiment, the stuffer 654 includes pockets 670 that receive the plug eCPA terminals 614, 616. The pockets 670 may be open at the top to receive the plug eCPA terminals 614, 616 through the open top.

Figure 21:
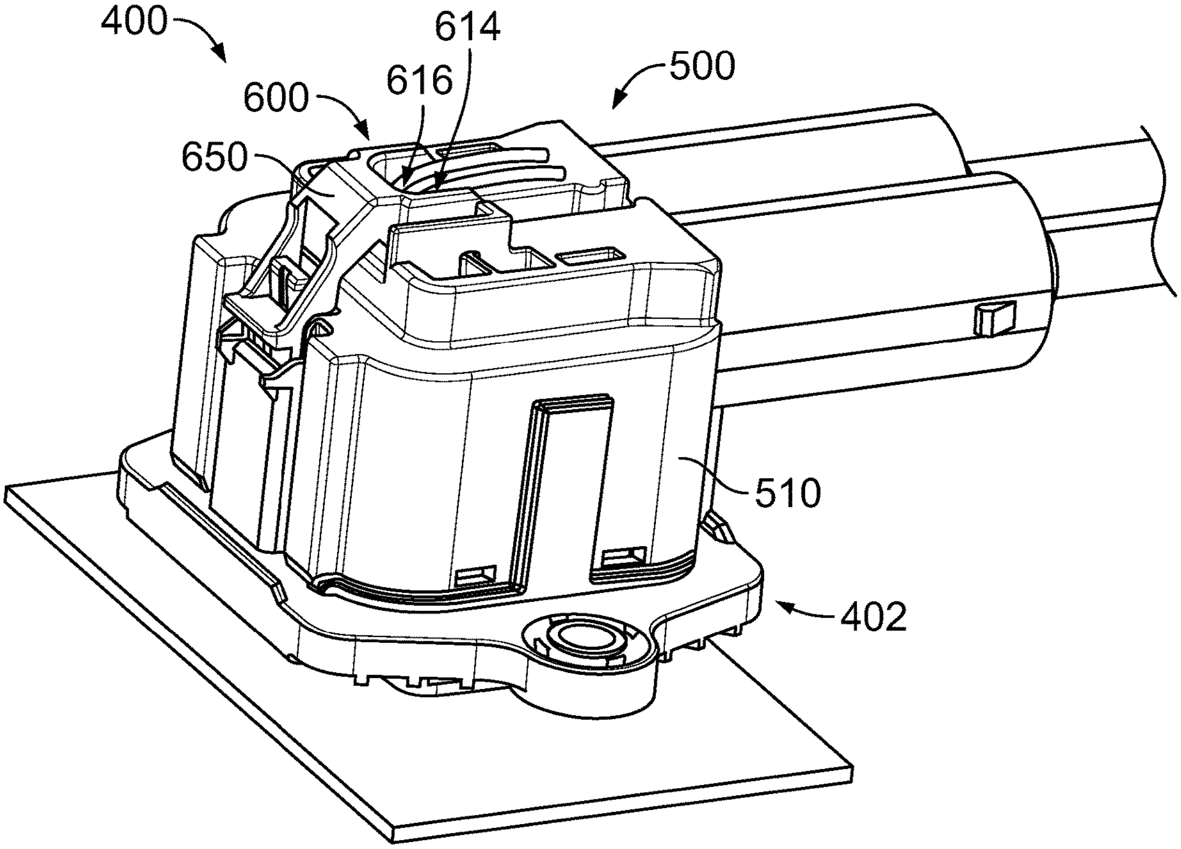
FIG. 21 is a top perspective view of the electrical connector system in accordance with an exemplary embodiment showing the plug connector mated with the header connector.

FIG. 21 is a top perspective view of the electrical connector system 400 in accordance with an exemplary embodiment showing the plug connector 500 mated with the header connector 402. The eCPA assembly 600 is shown in an unactuated state, compared to FIG. 16, which shows the eCPA assembly 600 in an actuated state.

The actuator 650 and the plug eCPA terminals 614, 616 of the eCPA assembly 600 are coupled to the plug housing 510. The actuator 650 is movably coupled to the plug housing 510 and movable between the unactuated or a retracted position (FIG. 21) and the actuated position or an advanced position (FIG. 16).

Figure 22:
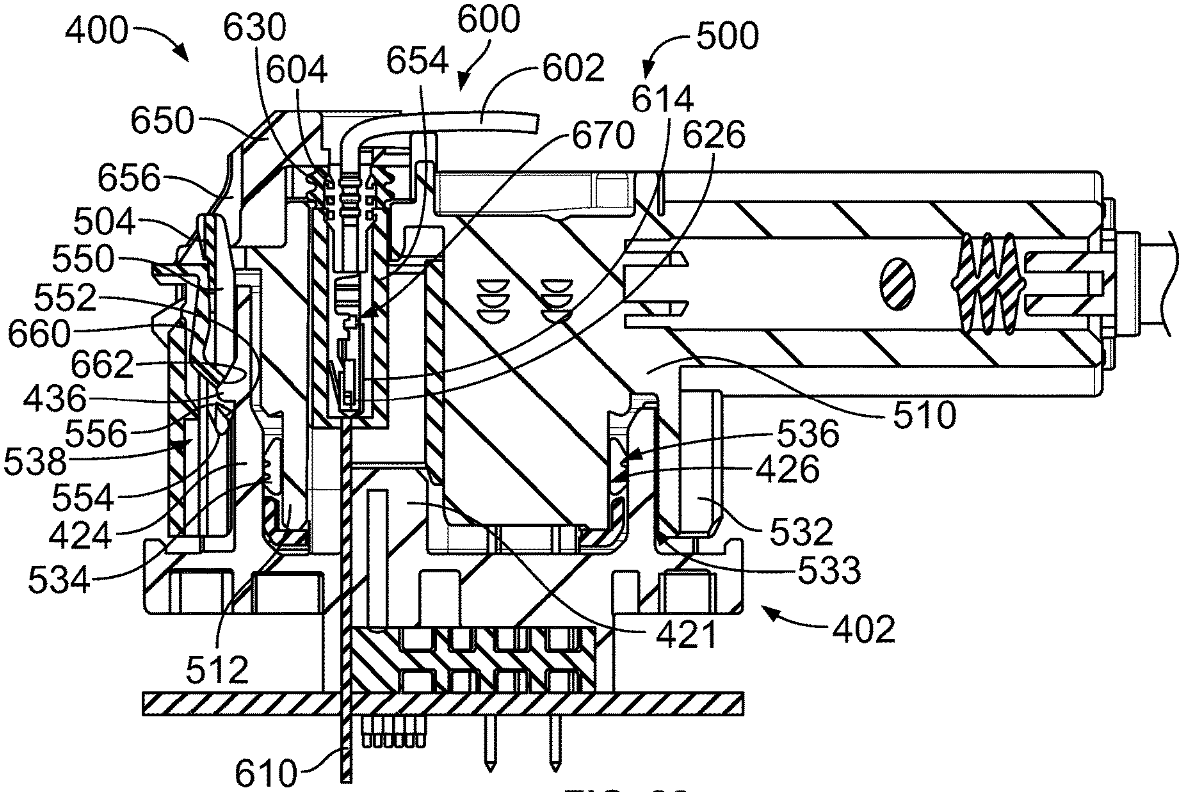
FIG. 22 is a cross-sectional view of a portion of the electrical connector system in accordance with an exemplary embodiment showing the plug connector coupled to the header connector with the eCPA assembly in a retracted position.
Figure 23:
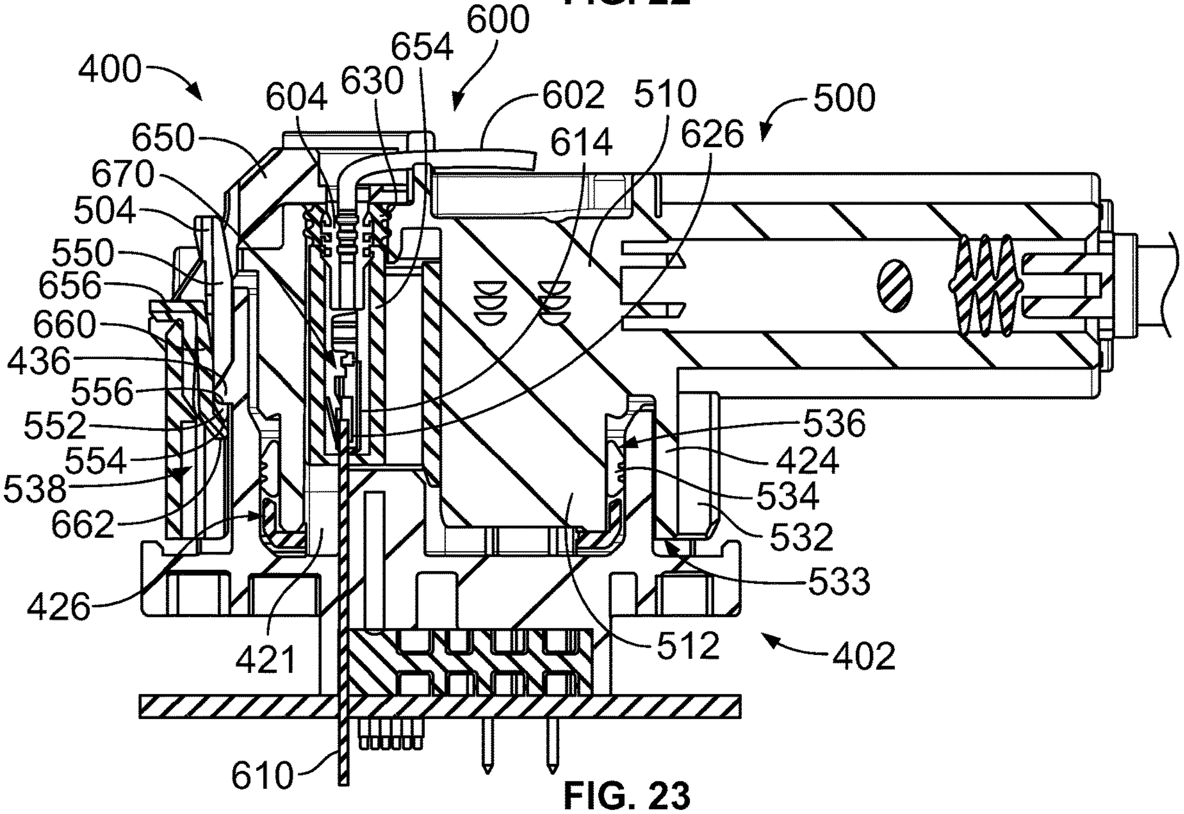
FIG. 23 is a cross-sectional view of a portion of the electrical connector system in accordance with an exemplary embodiment showing the plug connector coupled to the header connector with the eCPA assembly in an advanced position.

FIG. 22 is a cross-sectional view of a portion of the electrical connector system 400 in accordance with an exemplary embodiment showing the plug connector 500 coupled to the header connector 402 with the eCPA assembly 600 in a retracted position. FIG. 23 is a cross-sectional view of a portion of the electrical connector system 400 in accordance with an exemplary embodiment showing the plug connector 500 coupled to the header connector 402 with the eCPA assembly 600 in an advanced position. The eCPA assembly 600 is in an open state (for example, the position assurance circuit is open) in the retracted position. The eCPA assembly 600 is in a closed state (for example, the position assurance circuit is closed) in the advanced position.

The actuator 650 interacts with the latch 504. In an exemplary embodiment, the actuator 650 is configured to interface with the latch 504 in both the retracted position and the actuated position. For example, the blocking arm 660 is configured to interface with the latch 504. In an exemplary embodiment, both the latch 504 and the blocking arm 660 are located in the latch pocket 538. The stuffer 654 of the actuator 650 is received in an opening 533 in the outer wall 532 and extends into the cavity 516. The seal 630 surrounds the stuffer 654 and engages the plug housing 510 in the opening 533. The plug eCPA terminals 614, 616 are located in the pockets 670 and positioned in the cavity 516. The eCPA wires 602 may extend into the pockets 670. The wire seals 604 are located in the pockets 670 to seal the eCPA wires 602 to the actuator 650. The plug eCPA terminals 614, 616 are movable with the actuator 650. The eCPA wires 602 are movable with the actuator 650.

The eCPA wires 602 extend from the plug eCPA terminals 614, 616 to an exterior of the actuator 650 and to an exterior of the plug housing 510. The eCPA wires 602 receive the eCPA signals from the plug eCPA terminals 614, 616 and the header eCPA terminals 610, 612. The eCPA wires 602 send the eCPA signals to a remote device, for example, the second electrical device 412 (shown in FIG. 15). The eCPA signals may be used to control operation of the plug connector 500, such as to control power supply along the plug contacts 514 (shown in FIG. 18) to supply power to the header contacts 440 (shown in FIG. 19).

In an exemplary embodiment, the latch 504 includes a latch arm 550 and a latching beam 552. The latching beam 552 includes a tip 554 and a catch surface 556. The catch surface 556 is configured to engage the latching feature 436 to latchably secure the plug connector 500 to the header connector 402. When assembled, the blocking arm 660 is configured to interface with the latching beam 552. When the actuator 650 is in the retracted position (FIG. 22), the distal end 662 of the blocking arm 660 engages the latching beam 552. The latching beam 552 prevents the actuator 650 from moving forward to the actuated position.

During mating, the plug connector 500 is aligned with the header connector 402. The plug insert 512 is loaded into the shroud chamber 426. The header insert 421, which is located in the shroud chamber 426, is received in the cavity 516. The header contacts 440 (shown in FIG. 19), which are held by the header insert 421, are coupled to the plug contacts 514 (shown in FIG. 18). When mated, the plug housing 510 surrounds the exterior of the shroud 424. For example, the edge of the shroud 424 is received in the seal pocket 536 to interface with the environmental seal 534 to provide a sealed interface between the plug connector 500 and the header connector 402.

When mated, the latch 504 of the plug connector 500 is coupled to the latching feature 436 of the header connector 402. For example, the latching feature 436 is configured to be latchably coupled to the catch surface 556 of the latching beam 552. The latch arm 550 is deflectable and may be pressed to move the latch 504 from a latched position (engaged with the catch surface 556) to an unlatched position (disengaged from the catch surface 556). When the eCPA assembly 600 is in the retracted position (FIG. 22), the latch 504 is freely movable between the latched position and the unlatched position.

The eCPA assembly 600 is movably coupled to the plug housing 510. The eCPA assembly 600 is movable from the retracted position (FIG. 22) to the actuated position (FIG. 23). The eCPA assembly 600 may be moved to the actuated position by pushing downward on the handle 656. In the retracted position, the plug eCPA terminals 614, 616 are not mated to the fixed terminals 610, 612. The eCPA assembly 600 is in an open state (for example, the position assurance circuit is open). However, in the actuated position, the plug eCPA terminals 614, 616 are mated to the fixed terminals 610, 612. The eCPA assembly 600 is in a closed state (for example, the position assurance circuit is closed). The mating arms 626 are electrically connected to the fixed terminals 610, 612 to complete or close the position assurance circuit. The eCPA assembly 600 guarantees that the plug connector 500 is fully mated with the header connector 402 because the position assurance circuit is only closed after the connectors are fully mated. The plug connector 500 can only be unmated from the header connector 402 after the eCPA assembly 600 is moved to the retracted position, thus opening the position assurance circuit, and then unlatching the latch 504 and unmating the plug connector 500 from the header connector 402.

In an exemplary embodiment, the blocking arm 660 is movable relative to the latching beam 552 when the blocking arm 660 is deflected forward, such as by the latching feature 436. The latching feature 436 deflects the blocking arm 660 forward when the latching feature 436 is aligned with the distal end 662 (for example, when the latch 504 is latchably coupled to the latching feature 436. Such deflection offsets the distal end 662 relative to the latching beam 552, which frees the eCPA assembly 600 to move to the actuated position. When the eCPA assembly 600 is in the actuated position (FIG. 23), the blocking arm 660 extends along the latching beam 552 and blocks movement of the latching beam 552, and thus the latch 504. The blocking arm 660 blocks the latch 504 from moving from the latched position to the unlatched position. As such, the eCPA assembly 600, in the advanced position, operates as a locking device used to lock the plug connector 500 in the latched position. The eCPA assembly 600 is only movable to the actuated position when the latch 504 is in the latched position (for example, prior to being latched, the distal end 662 of the blocking arm 660 is blocked from moving to the actuated position by the latching beam 552). As such, the eCPA assembly 600 is used as an indication to the operator that the plug connector 500 is fully mated and latched.

In an exemplary embodiment, the seal 630 of the eCPA assembly 600 is sealed to the plug housing 510. In an exemplary embodiment, the seal 630 is movable within the opening 533 as the actuator 650 is moved from the retracted position to the actuated position. The seal 630 is provided at the opening 533 to provide a sealed environment for the eCPA assembly 600. The seal 630 is used to provide an environmental seal for the shroud chamber 426 and the contacts within the shroud chamber 426. The wire seals 604 provide environmental seals for the plug connector.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A plug connector comprising:

a plug housing extending between a front and a rear of the plug housing, the plug housing including a cavity, the plug housing configured to be coupled to a header connector, the plug housing having a mating end configured to be plugged into a header chamber of the header connector;

plug contacts held by the plug housing, the plug contacts configured to be mated with corresponding header contacts of the header connector; and an electrical connector position assurance (eCPA) assembly coupled to the plug housing, the eCPA including an actuator movably coupled to the plug housing, the actuator movable between a retracted position and an actuated position, the eCPA including an plug eCPA terminal coupled to the actuator and movable by the actuator between a mated position and an unmated position, the plug eCPA terminal configured to be mated with a header eCPA terminal of the header connector, the eCPA including an eCPA wire terminated to the plug eCPA terminal, the eCPA wire routed to a remote electrical device remote from the plug connector, the plug eCPA terminal being movable between the unmated position and the mated position as the actuator moves between the retracted position and the actuated position, the plug eCPA terminal and the eCPA wire forming a position assurance circuit with the header eCPA terminal in the mated position.

2. The plug connector of claim 1, wherein the plug eCPA terminal receives an eCPA signal from the header eCPA terminal, the eCPA wire transmits the eCPA signal to the remote electrical device.

3. The plug connector of claim 2, wherein the plug contacts are configured to transmit power to the header contacts only after the eCPA wire transmits the eCPA signal to the remote electrical device.

4. The plug connector of claim 1, wherein the plug eCPA terminal is crimped to an end of the eCPA wire.

5. The plug connector of claim 1, wherein the plug eCPA terminal is a first plug eCPA terminal and the eCPA wire is a first eCPA wire, the eCPA assembly further comprising a second plug eCPA terminal and a second eCPA wire coupled to the second plug eCPA terminal, the second plug eCPA terminal is coupled to the actuator and movable by the actuator, the second plug eCPA terminal is configured to be coupled to a second header eCPA terminal, the second plug eCPA terminal and the second eCPA wire forming the position assurance circuit with the second header eCPA terminal.

6. The plug connector of claim 1, wherein the eCPA wire moves with the actuator between the retracted position and the actuated position.

7. The plug connector of claim 1, wherein the actuator is blocked from moving to the actuated position until the plug housing is coupled to the header connector.

8. The plug connector of claim 1, wherein the actuator includes a main body and a blocking arm extending from the main body, the blocking arm movable between a clearance position and a blocking position as the actuator is moved from the retracted position to the actuated position, the blocking arm blocking movement of a latch of the plug housing used to latchably couple the plug housing to the header connector when the blocking arm is in the blocking position, the latch being movable without obstruction by the blocking arm when the blocking arm is in the clearance position.

9. The plug connector of claim 8, wherein the plug eCPA terminal is in the mated position only when the blocking arm is in the blocking position, wherein the blocking arm is movable between the blocking position and the clearance position only when the plug housing is coupled to the header connector.

10. The plug connector of claim 1, wherein the plug eCPA terminal is in the unmated position when the actuator is in the retracted position and wherein the plug eCPA terminal is in the mated position when the actuator is in the actuated position.

11. The plug connector of claim 1, wherein the eCPA assembly includes a seal coupled to the actuator, the seal providing sealing between the actuator and the plug housing, the seal being movable with the actuator.

12. A plug connector comprising:

a plug housing extending between a front and a rear of the plug housing, the plug housing including a cavity, the plug housing configured to be coupled to a header connector, the plug housing having a mating end configured to be plugged into a header chamber of the header connector;

a plug seal coupled to the plug housing, the plug seal configured to interface with the header connector to provide environmental sealing between the plug housing and the header connector;

plug contacts held by the plug housing, the plug contacts configured to be mated with corresponding header contacts of the header connector; and an electrical connector position assurance (eCPA) assembly coupled to the plug housing, the eCPA including an actuator, an plug eCPA terminal, an eCPA wire, and an eCPA seal, the actuator movably coupled to the plug housing, the actuator movable between a retracted position and an actuated position, the eCPA wire being terminated to the plug eCPA terminal and routed to a remote electrical device remote from the plug connector, the plug eCPA terminal being coupled to the actuator and movable by the actuator between a mated position and an unmated position, the plug eCPA terminal including a mating interface configured to be coupled to a header eCPA terminal of the header housing in the mated position, the plug eCPA terminal being movable between the unmated position and the mated position as the actuator moves between the retracted position and the actuated position, the plug eCPA terminal and the eCPA wire forming a position assurance circuit in the mated position when the plug eCPA terminal is coupled to the header eCPA terminal, the eCPA seal being coupled to the actuator, the eCPA seal providing sealing between the actuator and the plug housing.

13. The plug connector of claim 12, wherein the plug eCPA terminal receives an eCPA signal from the header eCPA terminal, the eCPA wire transmits the eCPA signal to the remote electrical device, the plug contacts being configured to transmit power to the header contacts only after the eCPA wire transmits the eCPA signal to the remote electrical device.

14. The plug connector of claim 12, wherein the eCPA wire moves with the actuator between the retracted position and the actuated position.

15. An electrical connector system comprising:

a header connector including a header housing and header contacts held by the header housing, the header housing having a base and a shroud extending from the base, the shroud surrounding a shroud chamber, the header contacts coupled to the base and extending into the shroud chamber;

a plug connector coupled to the header connector, the plug connector including a plug housing extending between a front and a rear of the plug housing, the plug housing including a cavity, the plug housing having a mating end plugged into the header chamber of the header connector, the plug connector including plug contacts held by the plug housing and extending into the cavity, the plug contacts mated with corresponding header contacts of the header connector;

an electrical connector position assurance (eCPA) assembly operably coupled to the header connector and the plug connector, the eCPA assembly including a header eCPA terminal in the shroud chamber, the eCPA including an actuator movably coupled to the plug housing, the actuator movable between a retracted position and an actuated position, the eCPA including a plug eCPA terminal coupled to the actuator and movable by the actuator between a mated position and an unmated position, the plug eCPA terminal including a mating interface configured to be coupled to the header eCPA terminal in the mated position, the plug eCPA terminal being movable between the unmated position and the mated position as the actuator moves between the retracted position and the actuated position, the eCPA including an eCPA wire terminated to the plug eCPA terminal, the eCPA wire routed to a remote electrical device remote from the plug connector, the eCPA terminal and the eCPA wire forming a position assurance circuit in the mated position when the plug eCPA terminal is coupled to the header eCPA terminal.

16. The electrical connector system of claim 15, wherein the plug eCPA terminal receives an eCPA signal from the header eCPA terminal, the eCPA wire transmits the eCPA signal to the remote electrical device, the plug contacts being configured to transmit power to the header contacts only after the eCPA wire transmits the eCPA signal to the remote electrical device.

17. The electrical connector system of claim 15, wherein the eCPA assembly includes a seal coupled to the actuator, the seal providing sealing between the actuator and the plug housing.

18. The electrical connector system of claim 15, wherein the header connector includes a header insert coupled to the header housing and located in the shroud chamber, the header insert holding the header contacts, the header insert holding the first and second fixed terminals.

19. The electrical connector system of claim 15, further comprising an environmental seal sealing coupled to the plug housing and sealing coupled to the header housing.

20. The electrical connector system of claim 15, wherein the actuator includes a main body and a blocking arm extending from the main body, the blocking arm movable between a clearance position and a blocking position as the actuator is moved from the retracted position to the actuated position, the blocking arm blocking movement of a latch of the plug housing used to latchably couple the plug housing to the header connector when the blocking arm is in the blocking position, the latch being movable without obstruction by the blocking arm when the blocking arm is in the clearance position.

* * * * *